US012204308B2

(12) United States Patent
Berman

(10) Patent No.: US 12,204,308 B2
(45) Date of Patent: *Jan. 21, 2025

(54) COMPUTERIZED SYSTEM AND METHOD FOR GENERATING AN UNDESIRABLE CHATTER FREE MILLING CNC PROGRAM FOR USE IN MACHINING A WORKPIECE

(71) Applicant: SOLIDCAM LTD., Or Yehuda (IL)

(72) Inventor: Michael Berman, Kfar Yona (IL)

(73) Assignee: SOLIDCAM LTD., Or Yehuda (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,209

(22) Filed: Oct. 26, 2023

(65) Prior Publication Data

US 2024/0061395 A1    Feb. 22, 2024

Related U.S. Application Data

(63) Continuation of application No. 17/991,093, filed on Nov. 21, 2022, now Pat. No. 11,841,693, which is a
(Continued)

(51) Int. Cl.
   *G05B 19/404*    (2006.01)
(52) U.S. Cl.
   CPC .. *G05B 19/404* (2013.01); *G05B 2219/33099* (2013.01); *G05B 2219/41256* (2013.01); *G05B 2219/45145* (2013.01)
(58) Field of Classification Search
   CPC ... H01L 22/20; G05B 19/41875; G06F 19/00; G06F 19/366
(Continued)

(56) References Cited

U.S. PATENT DOCUMENTS

| 4,200,015 A | 4/1980 | Gerber |
| 4,531,192 A | 7/1985 | Cook |

(Continued)

FOREIGN PATENT DOCUMENTS

| WO | 2016/025963 | 2/2016 |
| WO | WO-2016025963 A1 * | 2/2016 | ............. B23B 51/04 |
| WO | 2018/173030 | 9/2018 |

OTHER PUBLICATIONS

An International Search Report and a Written Opinion both dated Jun. 26, 2017, which issued during the prosecution of Applicant's PCT/IL2017/050345.
(Continued)

*Primary Examiner* — Ronald D Hartman, Jr.
(74) *Attorney, Agent, or Firm* — Sughrue Mion, PLLC

(57) ABSTRACT

A computerized method of machining a workpiece including, prior to machining the workpiece, establishing, based on empirical data obtained from machining activity at an earlier time, an historical mapping indicating pairings of depth of cut and rpm at which undesirable chatter (UDC) did not occur during machining activity at an earlier time using at least one given type of milling machine, at least one given type of cutting tool and at least one given type of workpiece material, prior to commencing machining of the workpiece, programming a machine tool to machine the workpiece using a given type of milling machine, a given type of cutting tool and a given type of workpiece material at at least one depth of cut and rpm, which, based on the historical mapping, avoid UDC and operating the machine tool in accordance with the programming to machine the workpiece.

12 Claims, 10 Drawing Sheets

Related U.S. Application Data continuation of application No. 17/358,299, filed on Jun. 25, 2021, now Pat. No. 11,550,292, which is a continuation of application No. 16/527,550, filed on Jul. 31, 2019, now Pat. No. 11,048,224, which is a continuation of application No. 15/525,514, filed as application No. PCT/IL2017/050345 on Mar. 20, 2017, now Pat. No. 10,416,648.

(58) Field of Classification Search
USPC .......................................................... 700/160
See application file for complete search history.

(56) References Cited

U.S. PATENT DOCUMENTS

| | | | | |
|---|---|---|---|---|
| 4,542,328 | A | 9/1985 | Pouyet | |
| 4,605,886 | A | 8/1986 | Inoue | |
| 4,608,476 | A | 8/1986 | Shimizu | |
| 4,618,924 | A | 10/1986 | Hinds | |
| 4,745,558 | A | 5/1988 | Kishi et al. | |
| 4,785,153 | A | 11/1988 | Stimmel | |
| 4,833,617 | A | 5/1989 | Wang | |
| 4,837,703 | A | 6/1989 | Kakazu et al. | |
| 4,870,561 | A | 9/1989 | Love et al. | |
| 4,907,164 | A | 3/1990 | Guyder | |
| 4,985,840 | A | 1/1991 | Shinozaki | |
| 5,043,906 | A | 8/1991 | Jepson | |
| 5,091,861 | A | 2/1992 | Geller | |
| 5,170,358 | A * | 12/1992 | Delio | G05B 19/4163 702/56 |
| 5,251,143 | A | 10/1993 | Maeda | |
| 5,297,022 | A | 3/1994 | Watanabe | |
| 5,351,196 | A | 9/1994 | Sowar et al. | |
| 5,515,290 | A | 5/1996 | Honda | |
| 5,526,272 | A | 6/1996 | Kondo | |
| 5,565,749 | A | 10/1996 | Jinno | |
| 5,596,504 | A | 1/1997 | Tata | |
| 5,703,782 | A | 12/1997 | Dundorf | |
| 5,768,136 | A | 6/1998 | Fujiwara | |
| 5,796,618 | A | 8/1998 | Maeda et al. | |
| 5,808,263 | A | 9/1998 | Beltrami | |
| 6,007,280 | A | 12/1999 | Asahi | |
| 6,065,858 | A | 5/2000 | Yamaguchi et al. | |
| 6,112,133 | A | 8/2000 | Fishman | |
| 6,266,572 | B1 | 7/2001 | Yamazaki et al. | |
| 6,311,100 | B1 | 10/2001 | Sarma | |
| 6,363,298 | B1 | 3/2002 | Shin et al. | |
| 6,447,223 | B1 | 9/2002 | Farah et al. | |
| 6,591,156 | B1 | 7/2003 | Fukaya | |
| 6,591,158 | B1 | 7/2003 | Bieterman et al. | |
| 7,012,395 | B2 | 3/2006 | Haunerdinger et al. | |
| 7,149,599 | B2 | 12/2006 | Arai | |
| 7,450,127 | B2 | 11/2008 | Hong | |
| 7,451,013 | B2 | 11/2008 | Coleman et al. | |
| 7,577,490 | B2 | 8/2009 | Diehl et al. | |
| 7,693,588 | B2 | 4/2010 | Hong | |
| 7,831,332 | B2 | 11/2010 | Diehl | |
| 8,000,834 | B2 | 8/2011 | Diehl | |
| 8,011,864 | B2 * | 9/2011 | Olgac | G05B 19/404 409/141 |
| 8,489,224 | B2 | 7/2013 | Berman | |
| 9,052,704 | B2 | 6/2015 | Berman et al. | |
| 9,292,626 | B2 | 3/2016 | Nelaturi et al. | |
| 9,823,645 | B2 | 11/2017 | Berman et al. | |
| 9,833,868 | B2 * | 12/2017 | Hwang | G05B 19/404 |
| 10,416,648 | B2 | 9/2019 | Berman | |
| 11,048,224 | B2 | 6/2021 | Berman | |
| 11,550,292 | B2 | 1/2023 | Berman | |
| 11,841,693 | B2 | 12/2023 | Berman | |
| 2002/0146296 | A1 * | 10/2002 | Schmitz | B23Q 17/0976 409/141 |
| 2005/0256604 | A1 | 11/2005 | Diehl et al. | |
| 2006/0159538 | A1 * | 7/2006 | Wang | B23Q 17/0976 409/141 |
| 2007/0179661 | A1 * | 8/2007 | Onozuka | G05B 19/40937 700/173 |
| 2008/0269943 | A1 | 10/2008 | Diehl et al. | |
| 2010/0161107 | A1 * | 6/2010 | Kappmeyer | G05B 19/4065 700/173 |
| 2010/0191359 | A1 | 7/2010 | Diehl et al. | |
| 2011/0178629 | A1 | 7/2011 | Diehl | |
| 2012/0093603 | A1 * | 4/2012 | Ueno | G05B 19/404 409/79 |
| 2013/0046405 | A1 * | 2/2013 | Shamoto | G05B 19/404 700/190 |
| 2013/0151000 | A1 | 6/2013 | Mackman | |
| 2013/0262066 | A1 | 10/2013 | Erdim et al. | |
| 2013/0272812 | A1 * | 10/2013 | Hamada | G05B 19/416 409/117 |
| 2013/0345853 | A1 | 12/2013 | Berman et al. | |
| 2014/0202293 | A1 * | 7/2014 | Van Handel | B23Q 11/0032 82/1.11 |
| 2014/0364990 | A1 * | 12/2014 | Lee | B23B 35/00 700/160 |
| 2014/0364991 | A1 * | 12/2014 | Lee | G05B 19/4163 700/160 |
| 2015/0306720 | A1 * | 10/2015 | Ono | B23Q 17/0976 700/174 |
| 2016/0161936 | A1 * | 6/2016 | Lee | B23Q 15/013 700/173 |
| 2016/0288285 | A1 * | 10/2016 | Piner | B23Q 17/0976 |
| 2018/0052439 | A1 * | 2/2018 | Chen | G05B 19/4065 |
| 2018/0292804 | A1 | 10/2018 | Berman | |
| 2019/0354078 | A1 | 11/2019 | Berman | |
| 2021/0389746 | A1 | 12/2021 | Berman | |
| 2023/0081968 | A1 | 3/2023 | Berman | |

OTHER PUBLICATIONS

An Office Action dated Nov. 2, 2018, which issued during the prosecution of U.S. Appl. No. 15/525,514.
Notice of Allowance dated Aug. 20, 2018, which issued during the prosecution of Australian Patent Application No. 2014313756.
Notice of Allowance dated Feb. 4, 2019, which issued during the prosecution of U.S. Appl. No. 15/729,230.
European Search Report dated Dec. 5, 2018 which issued during the prosecution of Applicant's European App No. 12752319.9.
Notice of Allowance dated May 31, 2019, which issued during the prosecution of U.S. Appl. No. 15/525,514.
An International Preliminary Report on Patentability dated Sep. 24, 2019, which issued during the prosecution of Applicant's PCT/IL2017/050345.
An Office Action dated September 4. 2020, which issued during the prosecution of U.S. Appl. No. 15/527,550.
Notice of Allowance dated Mar. 3, 2021, which issued during the prosecution of U.S. Appl. No. 15/527,550.
Notice of Allowance dated Aug. 4, 2023, which issued during the prosecution of U.S. Appl. No. 17/991,093.
An Office Action dated Aug. 26, 2022, which issued during the prosecution of U.S. Appl. No. 17/358,299.
An Office Action dated Apr. 25, 2023, which issued during the prosecution of U.S. Appl. No. 17/991,093.

* cited by examiner

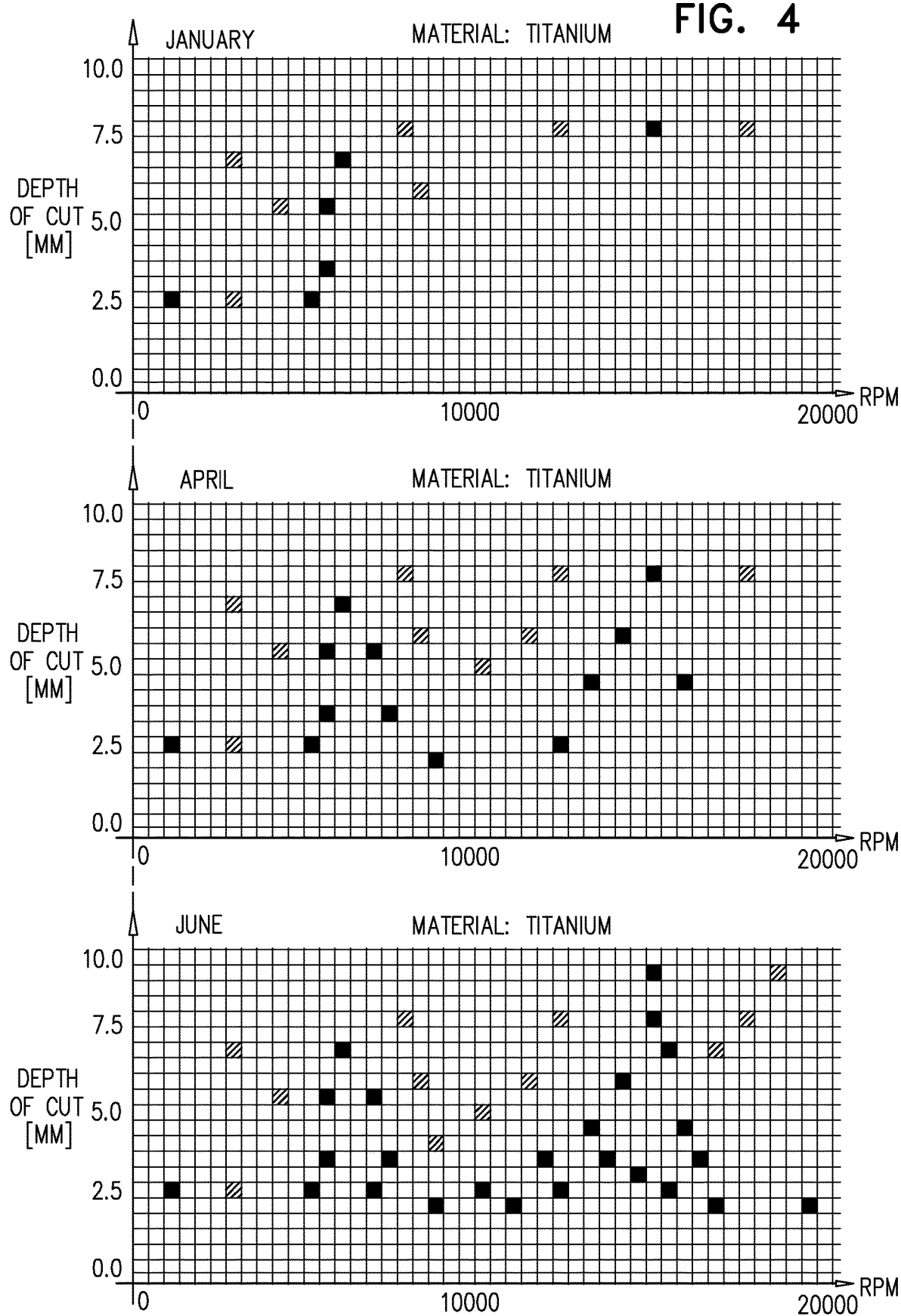

COMPUTERIZED SYSTEM AND METHOD FOR GENERATING AN UNDESIRABLE CHATTER FREE MILLING CNC PROGRAM FOR USE IN MACHINING A WORKPIECE

REFERENCE TO RELATED APPLICATIONS

The present application is a continuation application of U.S. patent application Ser. No. 17/991,093, filed Nov. 21, 2022, entitled "COMPUTERIZED SYSTEM AND METHOD FOR GENERATING AN UNDESIRABLE CHATTER FREE MILLING CNC PROGRAM FOR USE IN MACHINING A WORKPIECE", which is a continuation application of U.S. patent application Ser. No. 17/358,299, filed Jun. 25, 2021, entitled "COMPUTERIZED SYSTEM AND METHOD FOR GENERATING AN UNDESIRABLE CHATTER FREE MILLING CNC PROGRAM FOR USE IN MACHINING A WORKPIECE", which is a continuation application of U.S. patent application Ser. No. 16/527,550, filed Jul. 31, 2019, entitled "COMPUTERIZED SYSTEM AND METHOD FOR GENERATING AN UNDESIRABLE CHATTER FREE MILLING CNC PROGRAM FOR USE IN MACHINING A WORKPIECE", now U.S. Pat. No. 11,048,224, which is a continuation application of U.S. patent application Ser. No. 15/525,514, filed May 9, 2017, entitled "COMPUTERIZED SYSTEM AND METHOD FOR GENERATING AN UNDESIRABLE CHATTER FREE MILLING CNC PROGRAM FOR USE IN MACHINING A WORKPIECE", now U.S. Pat. No. 10,416,648, which is a National Phase application of PCT/IL2017/050345, filed Mar. 20, 2017, the disclosures of which are hereby incorporated by reference.

FIELD OF THE INVENTION

The present invention relates to systems and methods for milling workpieces and for generating milling CNC programs which avoid undesirable chatter (UDC).

BACKGROUND OF THE INVENTION

There are known various techniques for avoiding undesirable chatter (UDC).

SUMMARY OF THE INVENTION

The present invention seeks to provide systems and methods for milling workpieces and for generating milling CNC programs which avoid undesirable chatter (UDC).

There is thus provided in accordance with a preferred embodiment of the present invention a computerized method of machining a workpiece including prior to machining the workpiece, establishing, based on empirical data obtained from machining activity at an earlier time, an historical mapping indicating pairings of depth of cut and rpm at which undesirable chatter (UDC) did not occur during machining activity at an earlier time using at least one given type of milling machine, at least one given type of cutting tool and at least one given type of workpiece material, prior to commencing machining of the workpiece, programming a machine tool to machine the workpiece using one of the at least one given type of milling machine, one of the at least one given type of cutting tool and one of the at least one given type of workpiece material at at least one depth of cut and rpm, which, based on the historical mapping, avoid undesirable chatter and operating the machine tool in accordance with the programming to machine the workpiece.

Preferably, the programming includes employing known pairings of depth of cut and rpm, which are known from the historical mapping for the given type of milling machine, the given type of cutting tool and the given type of workpiece material to not create UDC for the at least one given type of milling machine, the at least one given type of cutting tool and the at least one given type of workpiece material, in order to ascertain a suitable rpm for a given depth of cut which will not create UDC.

In accordance with a preferred embodiment of the present invention the programming includes employing pairings of depth of cut and rpm, which are known from the historical mapping for the given type of milling machine, the given type of cutting tool and the given type of workpiece material to be within a predetermined neighborhood of known pairings known not to create UDC and not to be within a predetermined neighborhood of known pairings known to create UDC for the at least one given type of milling machine, the at least one given type of cutting tool and the at least one given type of workpiece material, in order to ascertain a suitable rpm for a given depth of cut which will not create UDC.

In accordance with a preferred embodiment of the present invention the programming includes employing known pairings of depth of cut and rpm, which are known from the historical mapping for the given type of milling machine, the given type of cutting tool and the given type of workpiece material to create UDC and known pairings of depth of cut and rpm, which are known from the historical mapping for the given type of milling machine, the given type of cutting tool and the given type of workpiece material not to create UDC, in order to ascertain a suitable rpm for a given depth of cut which will not create UDC.

Preferably, the suitable rpm for the given depth of cut need not correspond to one of the known pairings. Alternatively, the suitable rpm for the given depth of cut does not correspond to one of the known pairings.

In accordance with a preferred embodiment of the present invention the programming includes initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material and validating the at least one proposed pairing, based on the historical mapping.

In accordance with a preferred embodiment of the present invention the programming includes initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material, disallowing at least one of the at least one proposed pairing, based on the historical mapping, generating at least one revised CNC program for machining the workpiece based on the historical mapping, the initial CNC program including at least one alternative proposed pairing of depth of cut and rpm for at least one given type of milling machine, at least one given type of cutting tool and at least one given type of workpiece material and validating the at least one revised proposed pairing, based on the historical mapping.

There is also provided in accordance with another preferred embodiment of the present invention a computerized method of controlling operation of a machine tool in machining a workpiece including prior to machining the workpiece, establishing, based on empirical data obtained from machining activity at an earlier time, an historical mapping indicating pairings of depth of cut and rpm at which undesirable chatter (UDC) did not occur during machining activity at an earlier time using at least one given type of milling machine, at least one given type of cutting tool and at least one given type of workpiece material and prior to commencing machining of the workpiece, programming a machine tool to machine the workpiece using one of the at least one given type of milling machine, one of the at least one given type of cutting tool and one of the at least one given type of workpiece material at at least one depth of cut and rpm, which, based on the historical mapping, avoid undesirable chatter.

Preferably, the programming includes employing known pairings of depth of cut and rpm, which are known from the historical mapping for the given type of milling machine, the given type of cutting tool and the given type of workpiece material to not to create UDC for the at least one given type of milling machine, the at least one given type of cutting tool and the at least one given type of workpiece material, in order to ascertain a suitable rpm for a given depth of cut which will not create UDC.

In accordance with a preferred embodiment of the present invention the programming includes employing pairings of depth of cut and rpm, which are known from the historical mapping for the given type of milling machine, the given type of cutting tool and the given type of workpiece material to be within a predetermined neighborhood of known pairings known not to create UDC and not to be within a predetermined neighborhood of known pairings known to create UDC for the at least one given type of milling machine, the at least one given type of cutting tool and the at least one given type of workpiece material, in order to ascertain a suitable rpm for a given depth of cut which will not create UDC.

Preferably, the programming includes employing known pairings of depth of cut and rpm, which are known from the historical mapping for the given type of milling machine, the given type of cutting tool and the given type of workpiece material to create UDC and known pairings of depth of cut and rpm, which are known from the historical mapping for the given type of milling machine, the given type of cutting tool and the given type of workpiece material not to create UDC, in order to ascertain a suitable rpm for a given depth of cut which will not create UDC.

In accordance with a preferred embodiment of the present invention the programming includes the suitable rpm for the given depth of cut need not correspond to one of the known pairings.

Preferably, the suitable rpm for the given depth of cut does not correspond to one of the known pairings.

In accordance with a preferred embodiment of the present invention the programming includes initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material and validating the at least one proposed pairing, based on the historical mapping.

Preferably, the programming includes initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material, disallowing at least one of the at least one proposed pairing, based on the historical mapping, generating at least one revised CNC program for machining the workpiece based on the historical mapping, the initial CNC program including at least one alternative proposed pairing of depth of cut and rpm for at least one given type of milling machine, at least one given type of cutting tool and at least one given type of workpiece material and validating the at least one revised proposed pairing, based on the historical mapping.

There is further provided in accordance with yet another preferred embodiment of the present invention a computerized system for machining a workpiece, the system including an historic mapping generator operative, prior to machining the workpiece, to generate an historical mapping, based on empirical data obtained from machining activity at an earlier time, indicating pairings of depth of cut and rpm at which undesirable chatter (UDC) did not occur during machining activity at an earlier time using at least one given type of milling machine, at least one given type of cutting tool and at least one given type of workpiece material, a computerized machine tool programmer operative, prior to commencing machining of the workpiece, to generate a machine tool program enabling a machine tool to machine the workpiece using one of the at least one given type of milling machine, one of the at least one given type of cutting tool and one of the at least one given type of workpiece material at at least one depth of cut and rpm, which, based on the historical mapping, avoid undesirable chatter and a machine tool operable in accordance with the programming to machine the workpiece.

Preferably, the computerized machine tool programmer includes a suitable depth of cut and rpm ascertainer, employing known pairings of depth of cut and rpm, which are known from the historical mapping for the given type of milling machine, the given type of cutting tool and the given type of workpiece material to not create UDC for the at least one given type of milling machine, the at least one given type of cutting tool and the at least one given type of workpiece material, in order to ascertain a suitable rpm for a given depth of cut which will not create UDC.

In accordance with a preferred embodiment of the present invention the computerized machine tool programmer includes a suitable depth of cut and rpm ascertainer, employing pairings of depth of cut and rpm, which are known from the historical mapping for the given type of milling machine, the given type of cutting tool and the given type of workpiece material to be within a predetermined neighborhood of known pairings known not to create UDC and not to be within a predetermined neighborhood of known pairings known to create UDC for the at least one given type of milling machine, the at least one given type of cutting tool and the at least one given type of workpiece material, in order to ascertain a suitable rpm for a given depth of cut which will not create UDC.

Preferably, the computerized machine tool programmer includes a suitable depth of cut and rpm ascertainer, employing known pairings of depth of cut and rpm, which are known from the historical mapping for the given type of milling machine, the given type of cutting tool and the given type of workpiece material to create UDC and known pairings of depth of cut and rpm, which are known from the historical mapping for the given type of milling machine, the given type of cutting tool and the given type of workpiece material not to create UDC, in order to ascertain a suitable rpm for a given depth of cut which will not create UDC.

In accordance with a preferred embodiment of the present invention the suitable rpm for the given depth of cut need not correspond to one of the known pairings.

In accordance with a preferred embodiment of the present invention the suitable rpm for the given depth of cut does not correspond to one of the known pairings.

Preferably, the computerized machine tool programmer includes an initial CNC program generator, initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material and a proposed pairing validator, validating the at least one proposed pairing, based on the historical mapping.

In accordance with a preferred embodiment of the present invention the computerized machine tool programmer includes an initial CNC program generator, initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material, a proposed pairing disallower, disallowing at least one of the at least one proposed pairing, based on the historical mapping, a revised CNC program generator, generating at least one revised CNC program for machining the workpiece based on the historical mapping, the initial CNC program including at least one alternative proposed pairing of depth of cut and rpm for at least one given type of milling machine, at least one given type of cutting tool and at least one given type of workpiece material and a revised proposed pairing validator, validating the at least one revised proposed pairing, based on the historical mapping.

There is even further provided in accordance with still another preferred embodiment of the present invention a computerized system for controlling the machining of a workpiece, the system including an historic mapping generator operative, prior to machining the workpiece, to generate an historical mapping, based on empirical data obtained from machining activity at an earlier time, indicating pairings of depth of cut and rpm at which undesirable chatter (UDC) did not occur during machining activity at an earlier time using at least one given type of milling machine, at least one given type of cutting tool and at least one given type of workpiece material and a computerized machine tool programmer operative, prior to commencing machining of the workpiece, to generate a machine tool program enabling a machine tool to machine the workpiece using one of the at least one given type of milling machine, one of the at least one given type of cutting tool and one of the at least one given type of workpiece material at at least one depth of cut and rpm, which, based on the historical mapping, avoid undesirable chatter.

Preferably, the computerized machine tool programmer includes a suitable depth of cut and rpm ascertainer, employing known pairings of depth of cut and rpm, which are known from the historical mapping for the given type of milling machine, the given type of cutting tool and the given type of workpiece material to not create UDC for the at least one given type of milling machine, the at least one given type of cutting tool and the at least one given type of workpiece material, in order to ascertain a suitable rpm for a given depth of cut which will not create UDC.

In accordance with a preferred embodiment of the present invention the computerized machine tool programmer includes a suitable depth of cut and rpm ascertainer, employing pairings of depth of cut and rpm, which are known from the historical mapping for the given type of milling machine, the given type of cutting tool and the given type of workpiece material to be within a predetermined neighborhood of known pairings known not to create UDC and not to be within a predetermined neighborhood of known pairings known to create UDC for the at least one given type of milling machine, the at least one given type of cutting tool and the at least one given type of workpiece material, in order to ascertain a suitable rpm for a given depth of cut which will not create UDC.

In accordance with a preferred embodiment of the present invention the computerized machine tool programmer includes a suitable depth of cut and rpm ascertainer, employing known pairings of depth of cut and rpm, which are known from the historical mapping for the given type of milling machine, the given type of cutting tool and the given type of workpiece material to create UDC and known pairings of depth of cut and rpm, which are known from the historical mapping for the given type of milling machine, the given type of cutting tool and the given type of workpiece material not to create UDC, in order to ascertain a suitable rpm for a given depth of cut which will not create UDC.

Preferably, the suitable rpm for the given depth of cut need not correspond to one of the known pairings.

In accordance with a preferred embodiment of the present invention the suitable rpm for the given depth of cut does not correspond to one of the known pairings.

In accordance with a preferred embodiment of the present invention the computerized machine tool programmer includes an initial CNC program generator, initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material and a proposed pairing validator, validating the at least one proposed pairing, based on the historical mapping.

In accordance with a preferred embodiment of the present invention the computerized machine tool programmer includes an initial CNC program generator, initially generating an initial CNC program for machining the workpiece without necessarily considering UDC issues, the initial CNC program including at least one proposed pairing of depth of cut and rpm for at least one given type of milling machine, at least one given type of cutting tool and at least one given type of workpiece material, a proposed pairing disallower, disallowing at least one of the at least one proposed pairing, based on the historical mapping, a revised CNC program generator, generating at least one revised CNC program for machining the workpiece based on the historical mapping, the initial CNC program including at least one alternative proposed pairing of depth of cut and rpm for at least one given type of milling machine, at least one given type of cutting tool and at least one given type of workpiece material and a revised proposed pairing validator, validating the at least one revised proposed pairing, based on the historical mapping.

BRIEF DESCRIPTION OF THE DRAWINGS

The present invention will be understood and appreciated more fully from the following detailed description, taken in conjunction with the drawings in which:

FIG. 4 is a simplified illustration of the development of a historical undesirable chatter presence/absence (HUPA) map for a given workpiece material and tool type.

DETAILED DESCRIPTION OF PREFERRED EMBODIMENTS

Figure 1A:
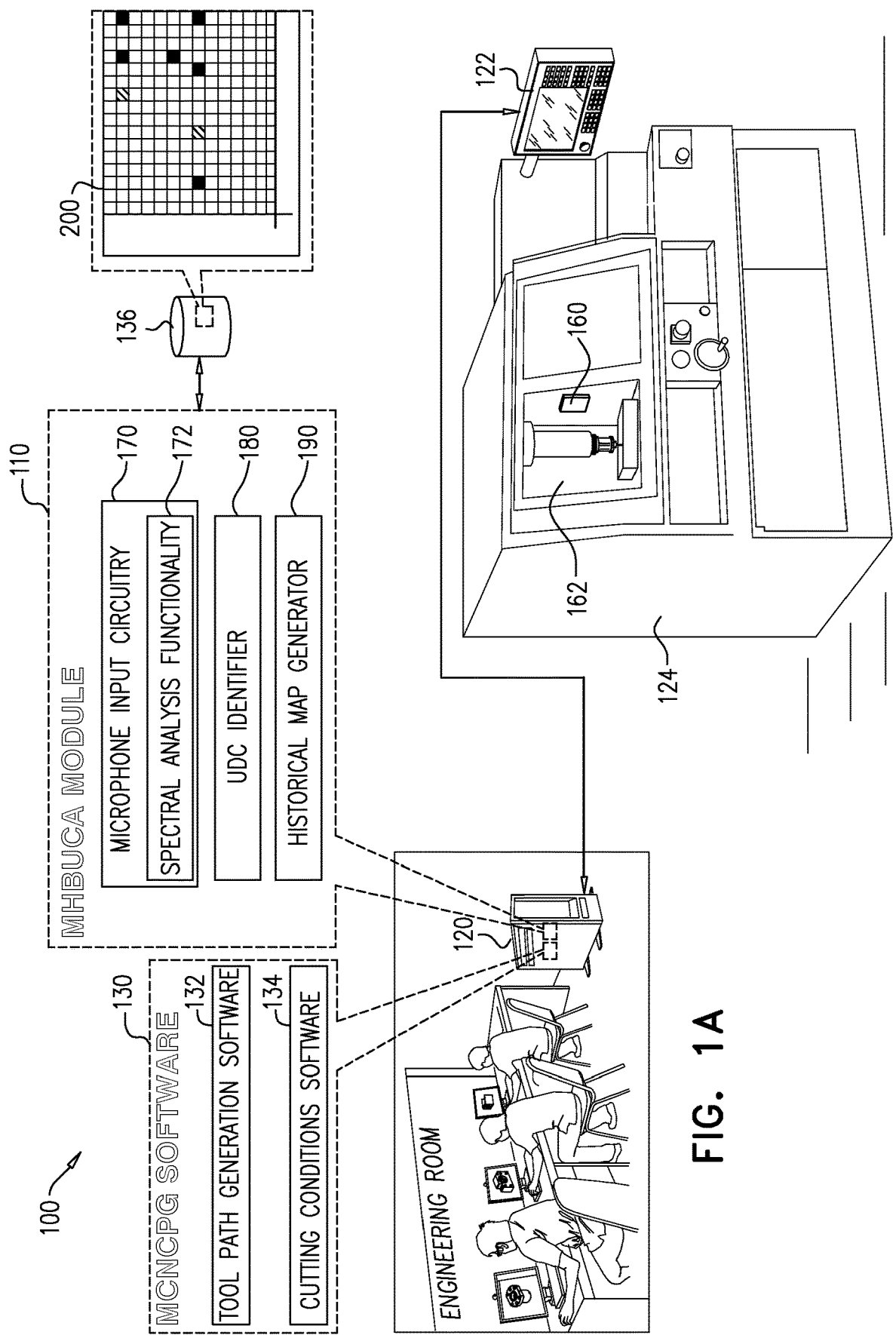
FIG. 1A is a simplified illustration of a milling CNC program generation CAM and CNC milling system and methodology including a milling history-based undesirable chatter avoidance module, constructed and operative in accordance with one embodiment of the present invention, resident on a CNC program generation CAM server.

Reference is now made to FIG. 1A, which is a simplified illustration of a milling CNC program generation CAM and CNC milling system 100 and methodology including a milling history-based undesirable chatter avoidance (MHBUCA) module 110, constructed and operative in accordance with one embodiment of the present invention, preferably resident on a CNC program generation CAM (CNCPGCAM) server 120. The CNCPGCAM server 120 provides a CNC program which is supplied to a CNC controller 122 of one or more CNC milling machines, such as a CNC machining center 124. The CNC program includes, inter alia, a tool path, spindle on/off commands, tool change commands, rpm commands, feed commands and coolant on/off commands.

The CNCPGCAM server 120 may be any suitable CNC program generation CAM server and is preferably a server hosting milling CNC program generation (MCNCPG) software 130. The MCNCPG software 130 preferably includes tool path generation (TPG) software 132 and cutting conditions management (CCM) software 134.

A preferred type of MCNCPG software 130 is Solidcam™ milling CNC program generation software and includes cutting conditions management software 134 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 1A is described hereinbelow with reference to CNC machining centers, it being understood that it is at least partially applicable to other types of CNC machine tools, such as mill/turn machines.

In accordance with a preferred embodiment of the present invention, MHBUCA module 110 stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

In the embodiment of FIG. 1A, the MCNCPG software 130 in CNCPGCAM server 120 is located in an engineering room wherein production engineers interact with the CNCPGCAM server 120 to generate the CNC programs which are downloaded to the CNC controller 122 of each CNC machining center 124.

The MHBUCA module 110 employs empirical data obtained from machining activity on at least one workpiece material at an earlier time, which data is stored in a historical empirical data (HED) database 136, associated therewith, to generate and store historical mappings indicating which pairings of depth of cut and rpm produce or do not produce tool undesirable chatter when at least one given type of tool is used to machine at least one given type of workpiece material. It is a particular feature of an embodiment of the present invention that the MHBUCA module 110 stores and utilizes pairs of depth of cut and rpm at which undesirable chatter (UDC) did not occur for past machining, using at least one given type of milling machine, at least one given type of cutting tool and at least one given type of workpiece material, in providing chatter avoidance.

In the illustrated embodiment of FIG. 1A, the historical empirical data is derived from earlier operation of a CNC machining center 124 and is employed to generate subsequent undesirable chatter-free (UDC-free) CNC programs for CNC machining center 124, such that milling operation of the CNC machining center 124 based on the CNC programs thus generated avoids undesirable chatter (UDC).

For the purposes of the present application "chatter" is defined as self-reinforced vibration of a cutting tool by its interaction with a workpiece surface being cut. "Undesirable Chatter" or UDC is defined as chatter having an amplitude above an acceptable threshold level, exceedance of which may damage one or more of cutting edges, an insert, an insert holder, a machine tool and the workpiece. In practice, the amplitude threshold is decided by a human, normally an experienced milling machine operator. Different amplitude thresholds may apply, inter alia, to different workpiece materials, different tools, different machine tools and different workpieces.

The following academic articles and patent publications which relate to chatter are hereby incorporated by reference:
- Chong Peng, et al., Time-Domain Simulation and Experimental Verification of Dynamic Cutting Forces and Chatter Stability for Circular Corner Milling, Proceedings of the Institution of Mechanical Engineers, Part B: Journal of Engineering Manufacture, volume 229, no. 6, pages 932-939, June 2015, published online before print Jun. 18, 2014;
- Jifang Tian, et al, Chatter Instability in Milling Systems with Flexible Rotating Spindles—A New Theoretical Approach, Journal of Manufacturing Science and Engineering, volume 123, issue 1, pages 1-9, Jul. 1, 1999;
- Pavel Bach, et al, A Comparative Analysis of Lower Speed Chatter Behavior, MM Science Journal, December 2013, page 434-440;
- U.S. Published Patent Application 2014/0114462A1 Yoshino et al, published Apr. 24, 2014; and
- U.S. Pat. No. 8,862,429, dated Oct. 14, 2014.

In accordance with a preferred embodiment of the invention, one or more microphone 160 is mounted on CNC machining center 124, such as within the machining chamber 162 of the CNC machining center 124 or on an outer housing thereof. The CNC machining center 124 also typically includes CNC controller 122. An output of microphone 160 is supplied to microphone input circuitry 170, forming part of MHBUCA module 110, and which may include spectral analysis functionality 172, such as Fast Fourier Transformation (FFT) functionality, which transforms the microphone output, which is in the time domain, to the frequency domain.

An output of the microphone input circuitry 170, which preferably includes the spectral analysis functionality 172, is in the frequency domain and is supplied to a UDC identifier 180, which identifies peaks in the frequency domain, which are not coincident with any of the harmonic peaks characteristic of the tooth passing frequency. If such peaks exceed a given height, corresponding to a predetermined amplitude threshold characterizing UDC, the presence of UDC is identified.

A historical map generator 190 receives a UDC presence input from the UDC identifier 180 having a time stamp and also receives, from CNC controller 122, at least one input providing current information indicating the tool currently being used in milling, the workpiece material being milled, the current depth of cut and the current rpm. On the basis of the aforesaid inputs, the historical map generator 190 creates a plurality of historical UDC presence/absence (HUPA) maps 200. It is a particular feature of an embodiment of the present invention that the HUPA maps 200 include depth of cut and rpm pairs for most or all instances where UDC did not occur. Preferably, but not necessarily, the HUPA maps 200 also include depth of cut and rpm pairs for most or all instances where UDC did occur.

For the purposes of the present application, each HUPA map 200 is specific to a given combination of workpiece material, type of tool and machine tool, here designated WMTTMT.

It is appreciated that separate HUPA maps 200 may be generated for a given WMTTMT based on various additional parameters including, for example a level of tool wear or the applicable threshold used for defining UDC. It is further appreciated that even more specific HUPA maps 200 may be generated for a given WMTTMT for each combination of a plurality of selectable machining parameters, for example, the corner radius of each cutting edge, the rake angle of each cutting edge, the flute helix angle of each cutting edge, the number of layers of inserts in an insert cutter, the number of inserts in each layer, the dimensions of each insert and the extent of overlap between layers of inserts.

The type of tool may be broken down, for example, as follows:
Solid carbide end mill
   Overall Cutting Diameter
   Cutting length and/or depth
   Shank diameter
   Type of carbide powder employed
   Number of flutes
   Helix angle/angles of flutes
   Rake angle of cutting edge
   Clearance angle of cutting edge
   Fixed/Variable Angular spacing between flutes
   Diameter of central core
   Configuration of bottom, for example
     Straight bottom
     Ball nose bottom
     Bull nose bottom
Insert cutters
   Insert Type
     Type of carbide powder employed
     Cutting length and/or depth
     Rake angle of cutting edge
     Clearance angle of cutting edge
     Corner radius
   Holder shank diameter
   Number of flutes
   Helix angle/angles of flutes
   Fixed/Variable Angular spacing between flutes
   Diameter of central core
   Configuration of bottom, for example
     Straight bottom
     Ball nose bottom It is appreciated that preferably, HUPA maps 200 are built up based on actual recorded microphone inputs from actual past machining operations on multiple workpieces. Thus, as seen in FIG. 4, initially only a few pixels, representing specific depth of cut and rpm pairings, appear, here typically represented by a black solid pixel indicating the absence of UDC and preferably also by a cross-hatched pixel indicating the presence of UDC. These pairings represent actual depth of cut and rpm pairings of historical machining operations for a given type of tool and material using the CNC machining center 124.

Over time, as more and more actual depth of cut and rpm pairings are utilized in actual machining of the CNC machining center 124, more and more pixels in each map are filled in, typically by a black solid pixel indicating the absence of UDC or by a cross-hatched pixel indicating the presence of UDC. A simplified illustration of the progressive building of the historical maps is seen in FIG. 4, which presents a map progression. It is appreciated that each different WMTTMT may preferably have its own map progression. FIG. 4 shows the map as it is built up over time, at three different times, typically separated one from the other by 3 months. It is seen that over time the pixels of the map are typically increasingly filled in with black solid pixels and are preferably also filled in with cross-hatched pixels. It is also seen that over time the black solid pixels tend to be increasingly grouped together, to the exclusion of cross-hatched pixels, thus indicating ranges of pairs of depth of cut and rpm for which UDC did not historically occur. This grouping also typically occurs for the cross-hatched pixels, indicating the presence of UDC.

The latest HUPA map 200 for each different WMTTMT is preferably stored in historical empirical data (HED) database 136 and is automatically consulted by the MCNCPG software 130, such as the IMACHINING® software, to validate the acceptability of the CNC program generated thereby.

A preferred methodology for this consultation is briefly summarized below:

The MCNCPG software 130 initially proposes a depth of cut/rpm pair;

If the depth of cut/rpm pair initially proposed by the MCNCPG software 130 corresponds to a black solid pixel, indicating that historically UDC was not encountered, the depth of cut/rpm pair is validated;

If the depth of cut/rpm pair initially proposed by the MCNCPG software 130 corresponds to a cross-hatched pixel, indicating that historically UDC was encountered, the depth of cut/rpm pair is disallowed;

If the depth of cut/rpm pair initially proposed by the MCNCPG software 130 does not correspond to a black solid pixel, which black solid pixel indicates that historically UDC was not encountered, and if the depth of cut/rpm pair initially proposed by the MCNCPG software 130 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 130 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 130 are cross-hatched pixels. If so, the depth of cut/rpm pair initially proposed by the MCNCPG software 130 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 130 are cross-hatched pixels. If so, the depth of cut/rpm pair initially proposed by the MCNCPG software 130 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 130 are not cross-hatched pixels. If so, the depth of cut/rpm pair initially proposed by the MCNCPG software 130 is not disallowed.

In a situation where the depth of cut/rpm pair proposed by the MCNCPG software 130 is neither validated nor disallowed, the system may proceed along one of the following operational paths:

1. Proceed to machine the workpiece using the depth of cut/rpm pair proposed by the MCNCPG software 130; or
2. Perform further analysis of the depth of cut/rpm pair proposed by the MCNCPG software 130.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 130 is validated.

If the next order neighborhood analysis does not result in validation of the depth of cut/rpm pair proposed by the MCNCPG software 130, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 130 is disallowed.

If the aforesaid further analysis does not result in either validation or disallowing of the depth of cut/rpm pair proposed by the MCNCPG software 130, preferably the system proceeds to machine the workpiece using the depth of cut/rpm pair proposed by the MCNCPG software 130.

More specifically, in accordance with a preferred embodiment of the present invention wherein CCM software 134 is provided, the TPG software 132 provides a proposed tool path output, defining for each machining operation: particulars of the tool, the depth of cut, the nominal feed speed and the tool trajectory, to the CCM software 134. The CCM software 134 provides, on the basis of the proposed tool path output, a cutting conditions output, defining for each machining operation: tool engagement angles for each point along the trajectory, the feed speed at each point along the trajectory and the rpm. The CCM software 134 and/or the TPG software 132 provide an undesirable chatter (UDC) avoidance input to MHBUCA module 110 including for each machining operation: the WMTTMT, the depth of cut, and the rpm.

MHBUCA module 110 consults HED database 136, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT or are validated as described hereinabove, no change in the rpm is made by MHBUCA module 110.

If the pairings of depth of cut and rpm did historically produce UDC for the given WMTTMT or are disallowed as described above, the rpm is considered to be UDC-problematic for the indicated depth of cut. Accordingly, a change in the rpm is proposed by MHBUCA module 110, based on HED database 136, which contains the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 110, the proposed replacement rpm is output to the CCM software 134, which confirms that the replacement rpm is suitable for use for the given WMTTMT under the cutting conditions already established by the CCM software 134 for the given operation. This confirmation is provided by the CCM software 134 to the MCNCPG software 130, which provides a final, UDC-free CNC program output ready for loading onto the CNC controller 122, prior to commencement of machining.

In accordance with another preferred embodiment of the present invention wherein CCM software 134 is not provided, the MCNCPG software 130 provides a proposed CNC program output, defining for each machining operation: the WMTTMT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTTMT, the depth of cut and the rpm are supplied as a UDC avoidance input to MHBUCA module 110.

MHBUCA module 110 consults HED database 136, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT or are validated as described above, no change in the rpm is made by MHBUCA module 110.

If the pairings of depth of cut and rpm did historically produce UDC for the given WMTTMT, or are disallowed as described above, the rpm is considered to be UDC-problematic for the indicated depth of cut. Accordingly, a change in the rpm is proposed by MHBUCA module 110, based on HED database 136, which contains the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 110, the proposed replacement rpm is output to the MCNCPG software 130, and preferably the operator confirms that the replacement rpm is suitable for use by the given tool and the given machine under the cutting conditions already established for the given operation. The MCNCPG software 130 provides a final UDC-free CNC program ready for loading onto the CNC controller 122 prior to commencement of machining.

It is appreciated that in accordance with a preferred embodiment of the present invention, the system operates initially in a learning mode wherein most of the pixels in the HUPA maps 200, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel or if the proposed depth of cut/rpm pair is neither validated nor disallowed, the MCNCPG software 130 provides a final CNC program using the proposed depth of cut/rpm pair, ready for loading onto the CNC controller 122 prior to commencement of machining.

When UDC occurs during machining, machining is automatically and immediately stopped and a new rpm is calculated by the MCNCPG software 130 in CNCPGCAM server 120, which rpm is believed, based on the information in the most up to date relevant HUPA map 200, to avoid UDC.

In cases where UDC does not occur for machining at a given depth of cut and rpm pairing for a given machine, tool and workpiece material, a corresponding pixel in an appropriate HUPA map 200 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 200 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 200, thus increasing the effectiveness of the system in predicting and thus avoiding UDC.

Figure 1B:
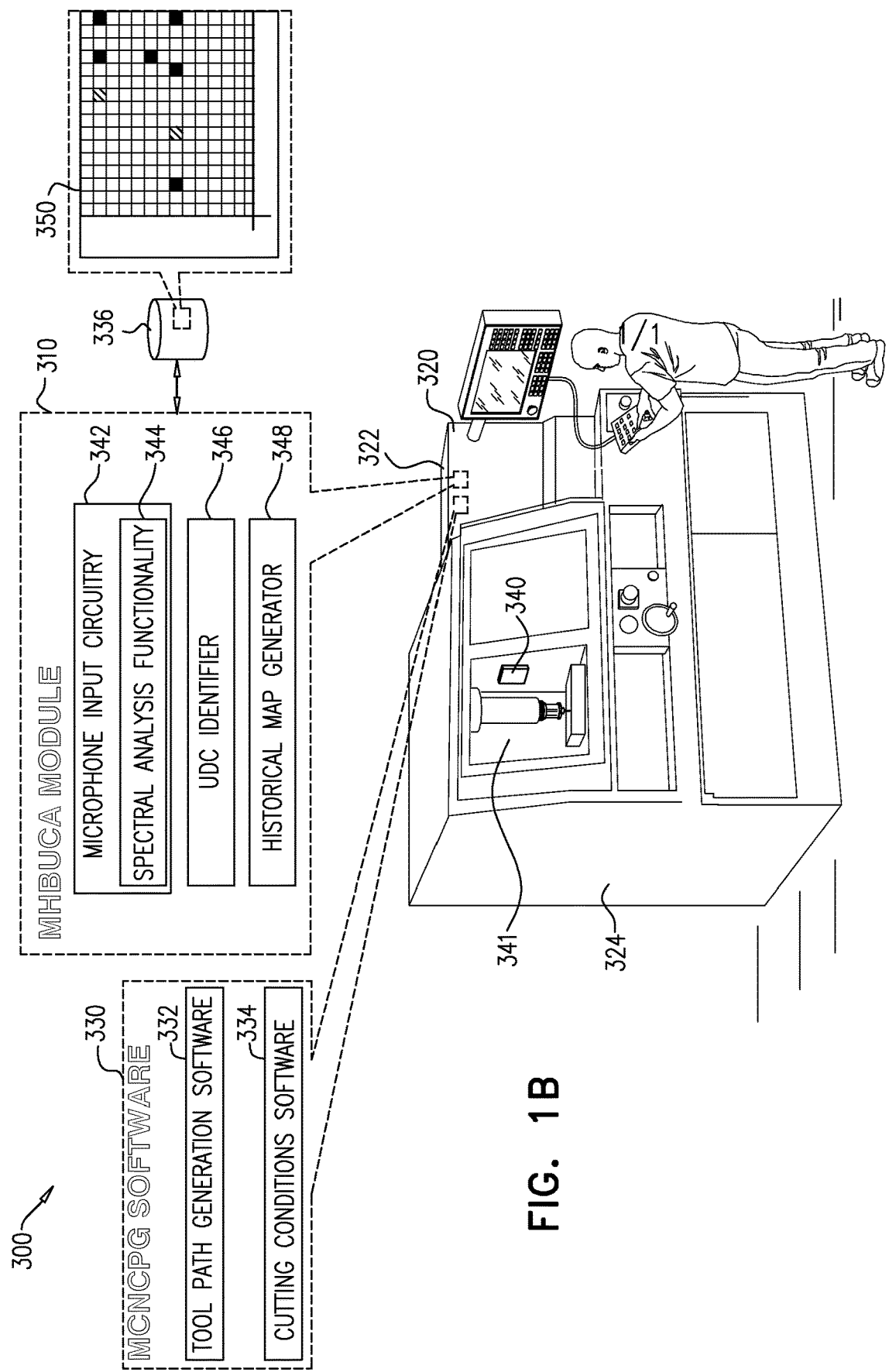
FIG. 1B is a simplified illustration of a 2.5-dimensional milling CNC program generation CAM and CNC milling system and methodology including a milling history-based undesirable chatter avoidance module, constructed and operative in accordance with one embodiment of the present invention, resident on a CNC controller.

Reference is now made to FIG. 1B, which is a simplified illustration of a 2.5D milling CNC program generation CAM and CNC milling system 300 and methodology including a milling history-based undesirable chatter (UDC) avoidance (MHBUCA) module 310, constructed and operative in accordance with another embodiment of the present invention. In this embodiment of the present invention, a CNC program generation CAM (CNCPGCAM) server 320 is preferably resident on a CNC controller 322, and provides a 2.5D CNC program, which is employed by the CNC controller 322 to operate a CNC milling machine, such as a CNC machining center 324. The CNC program includes inter alia, a tool path, spindle on/off commands, tool change commands, rpm commands, feed commands and coolant on/off commands.

The CNC program generation CAM server 320 may be any suitable 2.5D CNC program generation CAM server and is preferably a server hosting 2.5D milling CNC program generation (MCNCPG) software 330. The MCNCPG software 330 preferably includes tool path generation (TPG) software 332 and cutting conditions management (CCM) software 334.

A preferred type of milling CNC program generation (MCNCPG) software 330 is Solidcam™ milling CNC program generation software and includes cutting conditions management (CCM) software 334 embodied in an IMACHINING® 2.5D module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 1B is described hereinbelow with reference to CNC machining centers, it being understood that it is at least partially applicable to other types of CNC machine tools, such as mill/turn machines.

In accordance with a preferred embodiment of the present invention MHBUCA module 310 stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

In the embodiment of FIG. 1B, the MCNCPG software 330 in CNCPGCAM server 320 is located in CNC controller 322.

The MHBUCA module 310 employs empirical data obtained from machining activity on at least one workpiece material at an earlier time, which data is stored in a historical empirical data (HED) database 336, associated therewith, to generate and store historical mappings indicating which pairings of depth of cut and rpm produce or do not produce UDC when at least one given type of tool is used to machine at least one given type of workpiece material. It is a particular feature of an embodiment of the present invention that the MHBUCA module 310 stores and utilizes pairs of depth of cut and rpm at which UDC did not occur for past machining, using at least one given type of milling machine, at least one given type of cutting tool and at least one given type of workpiece material, in providing chatter avoidance.

In the illustrated embodiment of FIG. 1B, the historical empirical data is derived from earlier operation of CNC machining center 324 and is employed to generate subsequent UDC-free CNC programs for CNC machining center 324, such that milling operation of the CNC machining center 324 based on the CNC programs thus generated avoids UDC.

As in the embodiment of FIG. 1A, at least one microphone 340 is preferably mounted on CNC machining center 324, such as within the machining chamber 341 of the CNC machining center 324 or on an outer housing thereof. An output of microphone 340 is supplied to microphone input circuitry 342, forming part of MHBUCA module 310, which preferably includes spectral analysis functionality 344, which preferably operates as described hereinabove. MHBUCA module 310 preferably also includes a UDC identifier 346 which outputs to a historical map generator 348, which, as described hereinabove, creates a plurality of historical UDC presence/absence (HUPA) maps 350, as described hereinabove. It is a particular feature of an embodiment of the present invention that the HUPA maps 350 include depth of cut and rpm pairs for most or all instances where UDC did not occur. Preferably, but not necessarily, the HUPA maps 350 also include depth of cut and rpm pairs for most or all instances where UDC did occur.

The latest HUPA map 350 for each different WMTTMT is preferably stored in HED database 336 and is automatically consulted by the MCNCPG software 330, such as the IMACHINING® software, to validate the acceptability of the CNC program generated thereby.

A preferred methodology for this consultation is briefly summarized below:

The MCNCPG software 330 initially proposes a depth of cut/rpm pair;

If the depth of cut/rpm pair initially proposed by the MCNCPG software 330 corresponds to a black solid pixel, indicating that historically UDC was not encountered, the depth of cut/rpm pair is validated;

If the depth of cut/rpm pair initially proposed by the MCNCPG software 330 corresponds to a cross-hatched pixel, indicating that historically UDC was encountered, the depth of cut/rpm pair is disallowed;

If the depth of cut/rpm pair initially proposed by the MCNCPG software 330 does not correspond to a black solid pixel, which black solid pixel indicates that historically UDC was not encountered, and if the depth of cut/rpm pair initially proposed by the MCNCPG software 330 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 330 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 330 are cross-hatched pixels. If so, the depth of cut/rpm pair initially proposed by the MCNCPG software 330 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 330 are cross-hatched pixels. If so, the depth of cut/rpm pair initially proposed by the MCNCPG software 330 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 330 are not cross-hatched pixels. If so, the depth of cut/rpm pair initially proposed by the MCNCPG software 330 is not disallowed.

In a situation where the depth of cut/rpm pair proposed by the MCNCPG software 330 is neither validated nor disallowed, the system may proceed along one of the following operational paths:

1. Proceed to machine the workpiece using the depth of cut/rpm pair proposed by the MCNCPG software 330; or
2. Perform further analysis of the depth of cut/rpm pair proposed by the MCNCPG software 330.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 330 is validated.

If the next order neighborhood analysis does not result in validation of the depth of cut/rpm pair proposed by the MCNCPG software 330, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 330 is disallowed.

If the aforesaid further analysis does not result in either validation or disallowing of the depth of cut/rpm pair proposed by the MCNCPG software 330, preferably the system proceeds to machine the workpiece using the depth of cut/rpm pair proposed by the MCNCPG software 330.

More specifically, in accordance with a preferred embodiment of the present invention wherein cutting conditions management (CCM) software 334 is provided, the TPG software 332 provides a proposed tool path output, defining for each machining operation: particulars of the tool, the depth of cut, the nominal feed speed and the tool trajectory to the CCM software 334. The CCM software 334 provides, on the basis of the proposed tool path output, a cutting conditions output, defining for each machining operation: tool engagement angles for each point along the trajectory, the feed speed at each point along the trajectory and the rpm. The CCM software 334 and/or the TPG software 332 provide an undesirable chatter (UDC) avoidance input to MHBUCA module 310 including for each machining operation: the WMTTMT, the depth of cut, and the rpm.

MHBUCA module 310 consults HED database 336, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, no change in the rpm is made by MHBUCA module 310.

If the pairings of depth of cut and rpm did historically produce UDC for the given WMTTMT, or are disallowed as described above, the rpm is considered to be UDC-problematic for the indicated depth of cut. Accordingly, a change in the rpm is proposed by MHBUCA module 310, based on HED database 336, which contains the historical mappings indicating which pairings of depth of cut and rpm did historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 310, the proposed replacement rpm is output to the CCM software 334, which confirms that the replacement rpm is suitable for use for the given WMTTMT under the cutting conditions already established by the CCM software 334 for the given operation. This confirmation is provided by the CCM software 334 to the MCNCPG software 330 which provides a final, UDC-free CNC program output ready for execution by the CNC controller 322 prior to commencement of machining.

In accordance with another preferred embodiment of the present invention wherein CCM software 334 is not provided, the MCNCPG software 330 provides a proposed CNC program output, defining for each machining operation: the WMTTMT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTTMT, the depth of cut and the rpm are supplied as a UDC avoidance input to MHBUCA module 310.

MHBUCA module 310 consults HED database 336, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, or are validated as described above, no change in the rpm is made by MHBUCA module 310.

If the pairings of depth of cut and rpm did historically produce UDC for the given WMTTMT, or are disallowed as described above, the rpm is considered to be UDC-problematic for the indicated depth of cut. Accordingly, a change in the rpm is proposed by MHBUCA module 310, based on HED database 336, which contains the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 310, the proposed replacement rpm is output to the MCNCPG software 330, and preferably the operator confirms that the replacement rpm is suitable for use by the given tool and the given machine under the cutting conditions already established for the given operation. The MCNCPG software 330 provides a final UDC-free CNC program ready for execution by the CNC controller 322, prior to commencement of machining.

As noted above with reference to the embodiment of FIG. 1A, this preferred embodiment of the present invention operates initially in a learning mode wherein most of the pixels in the HUPA maps 350, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, or if the proposed depth of cut/rpm pair is neither validated nor disallowed, the MCNCPG software 330 provides a final CNC program using the proposed depth of cut/rpm pair, ready for loading onto the CNC controller 322 prior to commencement of machining.

When UDC occurs during machining, machining is automatically and immediately stopped and a new rpm is calculated by the MCNCPG software 330 in CNCPGCAM server 320, which rpm is believed, based on the information in the most up to date relevant HUPA map 350, to avoid UDC.

In cases where UDC does not occur for machining at a given depth of cut and rpm pairing for a given machine, tool and workpiece material, a corresponding pixel in an appropriate HUPA map 350 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 350 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 350, thus increasing the effectiveness of the system in predicting and thus avoiding UDC.

Figure 1C:
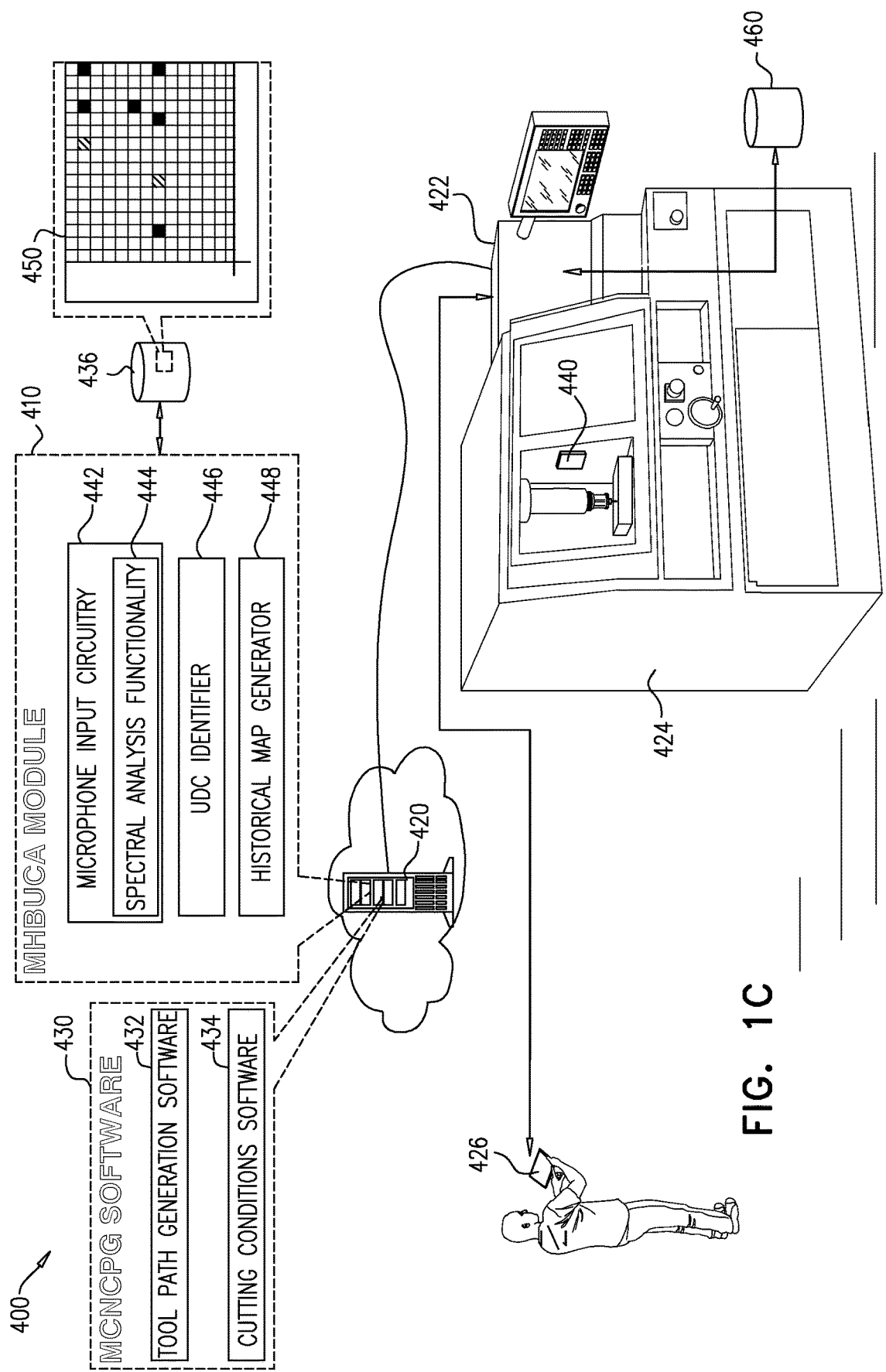
FIG. 1C is a simplified illustration of a 3-dimensional milling CNC program generation CAM and CNC milling system and methodology including a milling history-based undesirable chatter avoidance module, constructed and operative in accordance with one embodiment of the present invention, resident on a CNC program generation CAM server.

Reference is now made to FIG. 1C, which is a simplified illustration of a milling CNC program generation CAM and CNC milling system 400 and methodology including a milling history-based undesirable chatter (UDC) avoidance (MHBUCA) module 410, constructed and operative in accordance with another embodiment of the present invention. The embodiment of FIG. 1C is preferably a 3D system although alternatively it may be a 2.5D system. A CNC program generation CAM (CNCPGCAM) server 420 is preferably resident on the cloud and provides a CNC program, which is employed by a CNC controller 422 to operate a CNC milling machine such as a CNC machining center 424. The CNC program includes inter alia, a tool path, spindle on/off commands, tool change commands, rpm commands, feed commands and coolant on/off commands. An operator may control operation of system 400 locally or remotely via a wireless device 426, such as an I-PAD.

The CNC program generation CAM server 420 may be any suitable CNC program generation CAM server and is preferably a server hosting milling CNC program generation (MCNCPG) software 430. The MCNCPG software 430 preferably includes tool path generation (TPG) software 432 and cutting conditions management (CCM) software 434.

A preferred type of milling CNC program generation (MCNCPG) software 430 is Solidcam™ milling CNC program generation software and includes cutting conditions management (CCM) software 434 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 1C is described hereinbelow with reference to CNC machining centers, it being understood that it is at least partially applicable to other types of CNC machine tools, such as mill/turn machines.

In accordance with a preferred embodiment of the present invention MHBUCA module 410 is preferably resident on the cloud and stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

The MHBUCA module 410 employs empirical data obtained from machining activity on at least one workpiece material at an earlier time, which data is stored in a historical empirical data (HED) database 436, associated therewith, to generate and store historical mappings indicating which pairings of depth of cut and rpm produce or do not produce UDC when at least one given type of tool is used to machine at least one given type of workpiece material. It is a particular feature of an embodiment of the present invention that the MHBUCA module 410 stores and utilizes pairs of depth of cut and rpm at which UDC did not occur for past machining, using at least one given type of milling machine, at least one given type of cutting tool and at least one given type of workpiece material, in providing chatter avoidance. HED database 436 is preferably also located on the cloud, but may alternatively be located at the CNC controller 422 or elsewhere.

In the illustrated embodiment of FIG. 1C, the historical empirical data is derived from earlier operation of CNC machining center 424 and is employed to generate subsequent UDC-free CNC programs for CNC machining center 424, such that subsequent milling operation of the CNC machining center 424 based on the CNC programs thus generated avoids UDC.

As in the embodiments of FIGS. 1A and 1B, at least one microphone 440 is preferably mounted on CNC machining center 424 and its output is supplied to microphone input circuitry 442, which preferably includes spectral analysis functionality 444. Microphone input circuitry 442 forms part of MHBUCA module 410, which preferably operates as described hereinabove, and also includes a UDC identifier 446 which outputs to a historical map generator 448, which, as described hereinabove, creates a plurality of historical UDC presence/absence (HUPA) maps 450, as described hereinabove. It is a particular feature of an embodiment of the present invention that the HUPA maps 450 include depth of cut and rpm pairs for most or all instances where UDC did not occur. Preferably, but not necessarily, the HUPA maps 450 also include depth of cut and rpm pairs for most or all instances where UDC did occur.

The latest HUPA map 450 for each different WMTTMT is preferably stored in a database 460, which may be identical with or separate from HED database 436, and is automatically consulted by the tool generation software, such as the IMACHINING® software, to validate the acceptability of the CNC program generated thereby.

A preferred methodology for this consultation is briefly summarized below:

The MCNCPG software 430 initially proposes a depth of cut/rpm pair;

If the depth of cut/rpm pair initially proposed by the MCNCPG software 430 corresponds to a black solid pixel, indicating that historically UDC was not encountered, the depth of cut/rpm pair is validated;

If the depth of cut/rpm pair initially proposed by the MCNCPG software 430 corresponds to a cross-hatched pixel, indicating that historically UDC was encountered, the depth of cut/rpm pair is disallowed;

If the depth of cut/rpm pair initially proposed by the MCNCPG software 430 does not correspond to a black solid pixel, which black solid pixel indicates that historically UDC was not encountered, and if the depth of cut/rpm pair initially proposed by the MCNCPG software 430 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 430 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 430 are cross-hatched pixels. If so, the depth of cut/rpm pair initially proposed by the MCNCPG software 430 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 430 are cross-hatched pixels. If so, the depth of cut/rpm pair initially proposed by the MCNCPG software 430 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 430 are not cross-hatched pixels. If so, the depth of cut/rpm pair initially proposed by the MCNCPG software 430 is not disallowed.

In a situation where the depth of cut/rpm pair proposed by the MCNCPG software 430 is neither validated nor disallowed, the system may proceed along one of the following operational paths:

1. Proceed to machine the workpiece using the depth of cut/rpm pair proposed by the MCNCPG software 430; or
2. Perform further analysis of the depth of cut/rpm pair proposed by the MCNCPG software 430.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 430 is validated.

If the next order neighborhood analysis does not result in validation of the depth of cut/rpm pair proposed by the MCNCPG software 430, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 430 is disallowed.

If the aforesaid further analysis does not result in either validation or disallowing of the depth of cut/rpm pair proposed by the MCNCPG software 430, preferably the system proceeds to machine the workpiece using the depth of cut/rpm pair proposed by the MCNCPG software 430.

More specifically, in accordance with a preferred embodiment of the present invention wherein CCM software 434 is provided, the TPG software 432 provides a proposed tool path output, defining for each machining operation: particulars of the tool, the depth of cut, the nominal feed speed and the tool trajectory, to the CCM software 434. The CCM software 434 provides, on the basis of the proposed tool path output, a cutting conditions output, defining for each machining operation: tool engagement angles for each point along the trajectory, the feed speed at each point along the trajectory and the rpm. The CCM software 434 and/or the TPG software 432 provide a UDC avoidance input to MHBUCA module 410 including for each machining operation: the WMTTMT, the depth of cut, and the rpm.

MHBUCA module 410 consults HED database 436, associated therewith, or database 460, which may be associated with CNC controller 422, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, or are validated as described hereinabove, no change in the rpm is made by MHBUCA module 410.

If the pairings of depth of cut and rpm did historically produce UDC for the given WMTTMT, or are disallowed as described hereinabove, the rpm is considered to be UDC-problematic for the indicated depth of cut. Accordingly, a change in the rpm is proposed by MHBUCA module 410, based on the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 410, the proposed replacement rpm is output to the CCM software 434, which confirms that the replacement rpm is suitable for use for the given WMTTMT under the cutting conditions already established by the CCM software 434 for the given operation. This confirmation is provided by the CCM software 434 to the MCNCPG software 430 which provides a final, UDC-free CNC program output ready for execution by the CNC controller 422, prior to commencement of machining.

In accordance with another preferred embodiment of the present invention wherein CCM software 434 is not provided, the MCNCPG software 430 provides a proposed CNC program output, defining for each machining operation: the WMTTMT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTTMT, the depth of cut and the rpm are supplied as a UDC avoidance input to MHBUCA module 410.

MHBUCA module 410 consults HED database 436, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, or are validated as described above, no change in the rpm is made by MHBUCA module 410.

If the pairings of depth of cut and rpm did historically produce UDC for the given WMTTMT, or are disallowed as described above, the rpm is considered to be UDC-problematic for the indicated depth of cut. Accordingly, a change in the rpm is proposed by MHBUCA module 410, based on the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 410, the proposed replacement rpm is output to the MCNCPG software 430, and preferably the operator confirms that the replacement rpm is suitable for use by the given tool and the given machine under the cutting conditions already established for the given operation. The MCNCPG software 430 provides a final UDC-free CNC program ready for execution by the CNC controller 422 prior to commencement of machining.

As noted above with reference to the embodiments of FIGS. 1A and 1B, this preferred embodiment of the present invention operates initially in a learning mode wherein most of the pixels in the HUPA maps 450, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, the MCNCPG software 430 provides a final CNC program using the proposed depth of cut/rpm pair, ready for loading onto the CNC controller 422 prior to commencement of machining.

When UDC occurs during machining, machining is automatically and immediately stopped and a new rpm is calculated by the MCNCPG software 430 in CNCPGCAM server 420, which rpm is believed, based on the information in the most up to date relevant HUPA map 450, to avoid UDC.

In cases where UDC does not occur for machining at a given depth of cut and rpm pairing for a given machine, tool and workpiece material, a corresponding pixel in an appropriate HUPA map 450 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 450 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 450, thus increasing the effectiveness of the system in predicting and thus avoiding UDC.

Figure 2A:
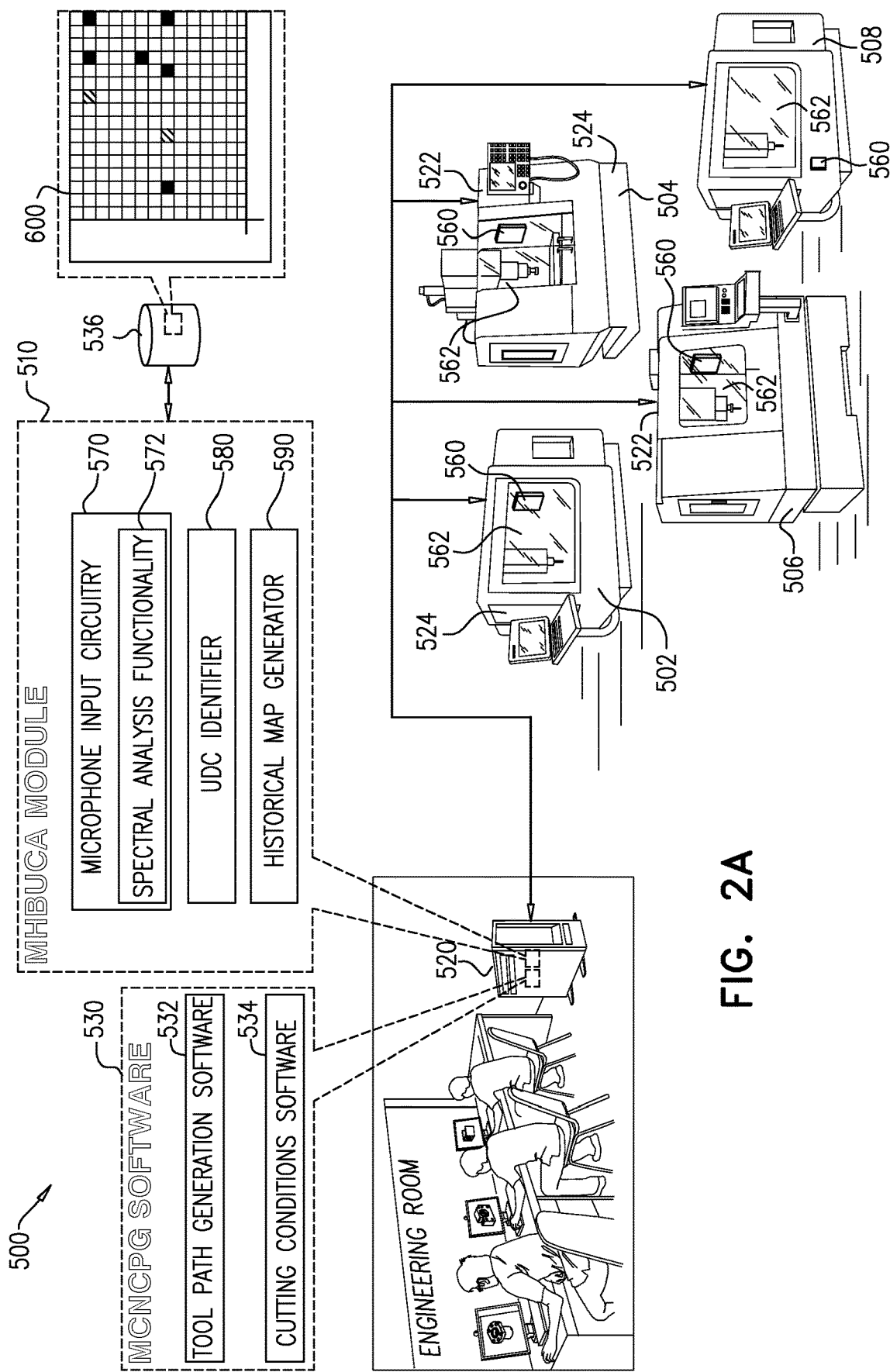
FIG. 2A is a simplified illustration of a milling CNC program generation CAM and CNC milling system and methodology employing multiple machine tools and including at least one milling history-based undesirable chatter avoidance module, constructed and operative in accordance with another embodiment of the present invention, resident on at least one CNC program generation CAM server.

Reference is now made to FIG. 2A, which is a simplified illustration of a milling CNC program generation CAM and CNC milling system 500 and methodology employing multiple machine tools, typically of different types made by different manufacturers and here designated by reference numerals 502, 504, 506 and 508. The multiple machine tools may or may not be in a common physical location.

System 500 preferably comprises at least one milling history-based undesirable chatter (UDC) avoidance (MH-BUCA) module 510, constructed and operative in accordance with one embodiment of the present invention, preferably resident on at least one CNC program generation CAM (CNCPGCAM) server 520. The CNCPGCAM server 520 provides a CNC program which is supplied to at least one CNC controller 522 of one or more CNC milling machines, such as CNC milling machining centers 524. The CNC program preferably includes, inter alia, a tool path, spindle on/off commands, tool change commands, rpm commands, feed commands and coolant on/off commands.

The CNCPGCAM server 520 may be any suitable CNC program generation CAM server and is preferably a server hosting milling CNC program generation (MCNCPG) software 530. The MCNCPG software 530 preferably includes tool path generation (TPG) software 532 and cutting conditions management (CCM) software 534.

A preferred type of MCNCPG software 530 is Solidcam™ milling CNC program generation software and includes cutting conditions management software 534 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 2A is described hereinbelow with reference to CNC machining centers, it being understood that it is at least partially applicable to other types of CNC machine tools, such as mill/turn machines.

In accordance with a preferred embodiment of the present invention, MHBUCA module 510 stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

In the embodiment of FIG. 2A, the MCNCPG software 530 in CNCPGCAM server 520 is located in an engineering room wherein production engineers interact with the CNCPGCAM server 520 to generate the CNC programs which are downloaded to CNC controllers 522 of each one of multiple CNC machining centers 524.

The MHBUCA module 510 employs empirical data obtained from machining activity on at least one workpiece material at an earlier time, which data is stored in a historical empirical data (HED) database 536, associated therewith, to generate and store historical mappings indicating which pairings of depth of cut and rpm produce or do not produce tool undesirable chatter (UDC) when at least one given type of tool is used to machine at least one given type of workpiece material. It is a particular feature of an embodiment of the present invention that the MHBUCA module 510 stores and utilizes pairs of depth of cut and rpm at which UDC did not occur for past machining, using at least one given type of milling machine, at least one given type of cutting tool and at least one given type of workpiece material, in providing chatter avoidance.

In the illustrated embodiment of FIG. 2A, the historical empirical data is derived from earlier operation of one or more CNC machining center 524 and is employed to generate subsequent UDC-free CNC programs for one or more CNC machining center 524, such that milling operation of the CNC machining centers 524 based on the CNC programs thus generated avoids UDC.

In accordance with a preferred embodiment of the invention, one or more microphone 560 is mounted on each CNC machining center 524, such as within the machining chamber 562 of the CNC machining center 524 or on an outer housing thereof. Each CNC machining center 524 also typically includes CNC controller 522. An output of microphone 560 is supplied to microphone input circuitry 570, forming part of MHBUCA module 510, and which may include spectral analysis functionality 572, such as Fast Fourier Transformation (FFT) functionality, which transforms the microphone output, which is in the time domain, to the frequency domain.

An output of the microphone input circuitry 570, which preferably includes the spectral analysis functionality 572, is in the frequency domain and is supplied to a UDC identifier 580 which identifies peaks in the frequency domain, which are not coincident with any of the harmonic peaks characteristic of the tooth passing frequency. If such peaks exceed a given height, corresponding to a predetermined amplitude threshold characterizing UDC, the presence of UDC is identified.

A historical map generator 590 receives a UDC presence input from the UDC identifier 580 having a time stamp and also receives, from the CNC controller 522 of the corresponding CNC machining center 524, at least one input providing current information indicating the tool currently being used in milling, the workpiece material being milled, the current depth of cut and the current rpm. On the basis of the aforesaid inputs, the historical map generator 590 creates a plurality of historical UDC presence/absence (HUPA) maps 600. It is a particular feature of an embodiment of the present invention that the HUPA maps 600 include depth of cut and rpm pairs for most or all instances where UDC did not occur. Preferably, but not necessarily, the HUPA maps 600 also include depth of cut and rpm pairs for most or all instances where UDC did occur.

Historical map generator 590 may receive a UDC presence input from at least one UDC identifier 580 based on empirical data originating from machines of the same type, manufactured by a same manufacturer or alternatively based on empirical data from machines of different types, manufactured by a same manufacturer. As a further alternative, historical map generator 590 may receive a UDC presence input from at least one UDC identifier 580 based on empirical data from machines of different types, manufactured by different manufacturers.

For the purposes of the present application, each HUPA map 600 is specific to a given combination of workpiece material and type of tool, here designated WMTT.

In accordance with one embodiment of the invention, similarly to the case described above with reference to FIGS. 1A-1C, each HUPA map 600 is machine tool specific as well and thus HUPA maps 600 are generated for each of the multiple machine tools in a shop. This is particularly relevant when the various CNC machining centers 524 are of different types or have different overall operating characteristics, which render them suitable for different machining tasks. In such a case, the generation of machine tool specific HUPA maps 600 is useful in enabling production planning and allocation of machining resources.

In accordance with another embodiment of the invention, as distinguished from the case described above with reference to FIGS. 1A-1C, non-machine tool specific HUPA (NMTSHUPA) maps 600 may be generated based on empirical data received from multiple machine tools having at least a predetermined level of similarity. For example, the multiple machine tools whose empirical data is used for generating a NMTSHUPA map 600 may be manufactured by different manufacturers but have the same power and speed capabilities. In another example, the multiple machine tools whose empirical data is used for generating a NMTSHUPA map 600 may be manufactured by the same manufacturer and have similar mechanical structures but have different spindle ratings. In a further example, the multiple machine tools whose empirical data is used for generating a NMTSHUPA map 600 may be manufactured by the same manufacturer or different manufacturers and have similar mechanical structures, rigidity, and ranges of movements along their various axes.

It is appreciated that separate NMTSHUPA maps 600 may be generated for a given WMTT based on various additional parameters including, for example, a level of tool wear or a different threshold applicable to the definition of UDC. It is further appreciated that even more specific NMTSHUPA maps 600 may be generated for a given WMTT for each combination of a plurality of selectable machining parameters, for example, the corner radius of each cutting edge, the rake angle of each cutting edge, the flute helix angle of each cutting edge, the number of layers of inserts in an insert cutter, the number of inserts in each layer, the dimensions of each insert and the extent of overlap between layers of inserts.

It is appreciated that preferably, NMTSHUPA maps 600 are built up based on actual recorded microphone inputs from actual past machining operations on multiple workpieces. Thus, similarly to that described hereinabove with reference to FIG. 4, initially only a few pixels, representing specific depth of cut and rpm pairings, appear, here typically represented by a black solid pixel indicating the absence of UDC and preferably also by a cross-hatched pixel indicating the presence of UDC. These pairings represent actual depth of cut and rpm pairings of historical machining operations for a given type of tool and material using one or more CNC machining centers 524.

Over time, as more and more actual depth of cut and rpm pairings are utilized in actual machining carried out by CNC machining centers 524, more and more pixels in each HUPA map 600 are filled in, typically by a black solid pixel indicating the absence of UDC or by a cross-hatched pixel indicating the presence of UDC. The latest HUPA map 600 for each different WMTT is preferably stored in HED database 536 and is automatically consulted by the MCNCPG software 530, such as the IMACHINING® software, to validate the acceptability of the CNC program generated thereby.

A preferred methodology for this consultation is briefly summarized below:

The MCNCPG software 530 initially proposes a depth of cut/rpm pair;

If the depth of cut/rpm pair initially proposed by the MCNCPG software 530 corresponds to a black solid pixel, indicating that historically UDC was not encountered, the depth of cut/rpm pair is validated;

If the depth of cut/rpm pair initially proposed by the MCNCPG software 530 corresponds to a cross-hatched pixel, indicating that historically UDC was encountered, the depth of cut/rpm pair is disallowed;

If the depth of cut/rpm pair initially proposed by the MCNCPG software 530 does not correspond to a black solid pixel, which black solid pixel indicates that historically UDC was not encountered, and if the depth of cut/rpm pair initially proposed by the MCNCPG software 530 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 530 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 530 are cross-hatched pixels. If so, the depth of cut/rpm pair initially proposed by the MCNCPG software 530 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 530 are cross-hatched pixels. If so, the depth of cut/rpm pair initially proposed by the MCNCPG software 530 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 530 are not cross-hatched pixels. If so, the depth of cut/rpm pair initially proposed by the MCNCPG software 530 is not disallowed.

In a situation where the depth of cut/rpm pair proposed by the MCNCPG software 530 is neither validated nor disallowed, the system may proceed along one of the following operational paths:

1. Proceed to machine the workpiece using the depth of cut/rpm pair proposed by the MCNCPG software 530; or
2. Perform further analysis of the depth of cut/rpm pair proposed by the MCNCPG software 530.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 530 is validated.

If the next order neighborhood analysis does not result in validation of the depth of cut/rpm pair proposed by the MCNCPG software 530, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 530 is disallowed.

If the aforesaid further analysis does not result in either validation or disallowing of the depth of cut/rpm pair proposed by the MCNCPG software 530, preferably the system proceeds to machine the workpiece using the depth of cut/rpm pair proposed by the MCNCPG software 530.

More specifically, in accordance with a preferred embodiment of the present invention wherein cutting conditions management (CCM) software 534 is provided, the TPG software 532 provides a proposed tool path output, defining for each machining operation: particulars of the tool, the depth of cut, the nominal feed speed and the tool trajectory, to the CCM software 534. The CCM software 534 provides, on the basis of the proposed tool path output, a cutting conditions output, defining for each machining operation: tool engagement angles for each point along the trajectory, the feed speed at each point along the trajectory and the rpm. The CCM software 534 and/or the TPG software 532 provide a UDC avoidance input to MHBUCA module 510 including for each machining operation: the WMTT, the depth of cut, and the rpm.

MHBUCA module 510 consults HED database 536, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described hereinabove, no change in the rpm is made by MHBUCA module 510.

If the pairings of depth of cut and rpm did historically produce UDC for the given WMTT, or are disallowed as described above, the rpm is considered to be UDC-problematic for the indicated depth of cut. Accordingly, a change in the rpm is proposed by MHBUCA module 510, based on HED database 536, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Where a change in the rpm is proposed by the MHBUCA module 510, the proposed replacement rpm is output to the CCM software 534, which confirms that the replacement rpm is suitable for use for the given WMTT under the cutting conditions already established by the CCM software 534 for the given operation. This confirmation is provided by the CCM software 534 to the MCNCPG software 530, which provides a final, UDC-free CNC program output ready for loading onto the CNC controller 522 of a given machine tool, prior to commencement of machining.

In accordance with another preferred embodiment of the present invention wherein CCM software 534 is not provided, MCNCPG software 530 provides a proposed CNC program output, defining for each machining operation: the WMTT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTT, the depth of cut and the rpm are supplied as a UDC avoidance input to MHBUCA module 510.

MHBUCA module 510 consults HED database 536, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described above, no change in the rpm is made by MHBUCA module 510.

If the pairings of depth of cut and rpm did historically produce UDC for the given WMTT, or are disallowed as described above, the rpm is considered to be UDC-problematic for the indicated depth of cut. Accordingly, a change in the rpm is proposed by MHBUCA module 510, based on HED database 536, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Additionally or alternatively, where multiple machine tools having at least somewhat different characteristics are suitable and available for a given machining operation for a given WMTT and where HED database 536 contains multiple HUPA maps 600 corresponding to different available machine tools, the MHBUCA module 510 may select one or more specific machine tools from among all of the suitable and available machine tools to carry out the machining operation. Furthermore, the MHBUCA module 510 may select one or more specific machine tools from among all of the suitable and available machine tools which will carry out the given machining operation in an optimal manner not only from the perspective of UDC avoidance but also from the perspective of machining efficiency, such as machining cycle time.

Where a change in the rpm is proposed by the MHBUCA module 510, the proposed replacement rpm is output to the MCNCPG software 530, and preferably the operator confirms that the replacement rpm is suitable for use by the given tool and the given machine under the cutting conditions already established for the given operation. The MCNCPG software 530 provides a final UDC-free CNC program ready for loading onto the CNC controller 522 prior to commencement of machining.

It is appreciated that this embodiment of the present invention operates initially in a learning mode wherein most of the pixels in the HUPA maps 600, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given proposed non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, or if the proposed depth of cut/rpm pair is neither validated nor disallowed, the MCNCPG software 530 provides a final CNC program using the proposed depth of cut/rpm pair, ready for loading onto the CNC controller 522 prior to commencement of machining.

It is a particular feature of the embodiment of the present invention described hereinabove with reference to FIG. 2A, that where the proposed depth of cut/rpm pair is neither validated nor disallowed based on machine tool specific HUPA maps 600, MHBUCA module 510 may consult non-machine tool specific HUPA maps 600 in HED database 536, which, being based on a relatively large number of machining events may be substantially more populated than corresponding machine tool specific HUPA maps 600.

When UDC occurs during machining, machining is automatically and immediately stopped and a new rpm is calculated by the MCNCPG software 530 in CNCPGCAM server 520, which rpm is believed, based on the information in the most up to date relevant HUPA map 600, to avoid UDC.

In cases where UDC does not occur for machining at a given depth of cut and rpm pairing for a given machine, tool and workpiece material, a corresponding pixel in an appropriate HUPA map 600 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 600 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 600, thus increasing the effectiveness of the system in predicting and thus avoiding UDC.

Figure 2B:
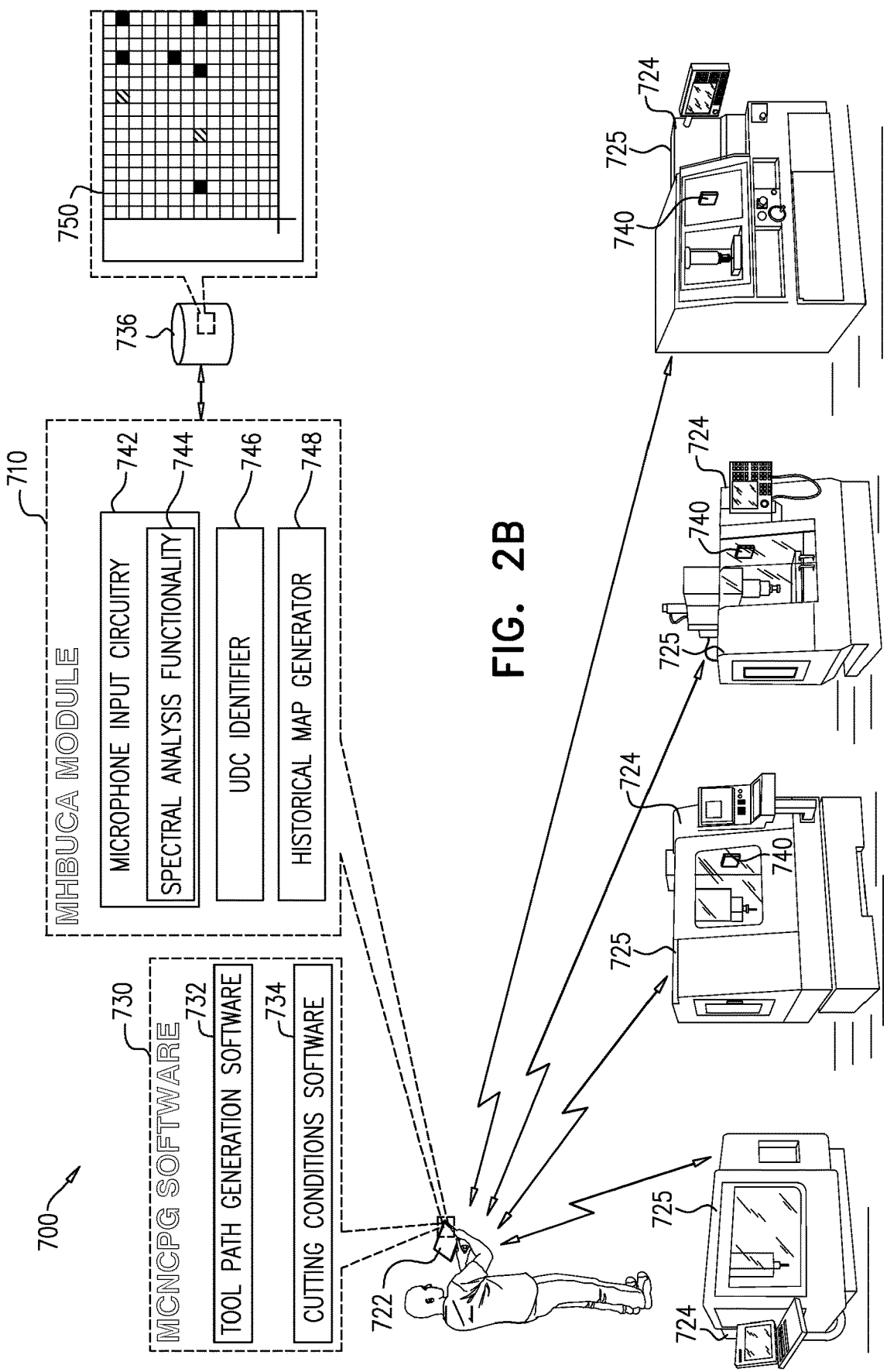
FIG. 2B is a simplified illustration of a 2.5-dimensional milling CNC program generation CAM and CNC milling system and methodology employing multiple machine tools and including at least one milling history-based undesirable chatter avoidance module, constructed and operative in accordance with another embodiment of the present invention, resident on at least one CNC program generation CAM server.

Reference is now made to FIG. 2B, which is a simplified illustration of a 2.5D milling CNC program generation CAM and CNC milling system 700 and methodology including a milling history-based undesirable chatter (UDC) avoidance (MHBUCA) module 710, constructed and operative in accordance with another embodiment of the present invention. In this embodiment of the present invention, a CNC program generation CAM (CNCPGCAM) server 720 is preferably resident on a notebook computer 722 carried by a production manager.

Preferably, CNCPGCAM server 720 communicates with CNC controllers 724 of a plurality of machine tools which are managed by the production manager, and provides a CNC program, which is employed by each of the CNC controllers 724 to operate a corresponding CNC milling machine, such as a CNC machining center 725. The CNC program includes inter alia, a tool path, spindle on/off commands, tool change commands, rpm commands, feed commands and coolant on/off commands.

The CNCPGCAM server 720 may be any suitable CNC program generation CAM server and is preferably a server hosting milling CNC program generation (MCNCPG) software 730. The MCNCPG software 730 preferably includes tool path generation (TPG) software 732 and cutting conditions management (CCM) software 734.

A preferred type of milling CNC program generation (MCNCPG) software 730 is Solidcam™ milling CNC program generation software and includes cutting conditions management (CCM) software 734 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 2B is described hereinbelow with reference to CNC machining centers, it being understood that it is at least partially applicable to other types of CNC machine tools, such as mill/turn machines.

In accordance with a preferred embodiment of the present invention MHBUCA module 710 stores and utilizes pairs of depth of cut and rpm at which undesirable chatter (UDC) did not occur for past machining, using at least one given type of milling machine, at least one given type of cutting tool and at least one given type of workpiece material, and thus provides UDC avoidance as part of the CNC program generation. In the embodiment of FIG. 2B, the MCNCPG software 730 in CNCPGCAM server 720 is located on the notebook computer 722.

MHBUCA module 710 employs empirical data obtained from machining activity on at least one workpiece material at an earlier time, which data is stored in a historical empirical data (HED) database 736, associated therewith, to generate and store historical mappings indicating which pairings of depth of cut and rpm produce or do not produce UDC when at least one given type of tool is used to machine at least one given type of workpiece material. It is a particular feature of an embodiment of the present invention that the MHBUCA module 710 stores and utilizes pairs of depth of cut and rpm at which undesirable chatter (UDC) did not occur for past machining, using at least one given type of milling machine, at least one given type of cutting tool and at least one given type of workpiece material, in providing chatter avoidance.

In the illustrated embodiment of FIG. 2B, the historical empirical data is derived from earlier operation of CNC machining center 725 and is employed to generate subsequent UDC-free CNC programs for CNC machining center 725, such that milling operation of the CNC machining center 725 based on the CNC programs thus generated avoids UDC.

As in the embodiment of FIG. 2A, at least one microphone 740 is preferably mounted on each CNC machining center 725 and its output is supplied to microphone input circuitry 742, which preferably includes spectral analysis functionality 744. Microphone input circuitry 742 forms part of MHBUCA module 710, which preferably operates as described hereinabove and also includes a UDC identifier 746, which outputs to a historical map generator 748, which, as described hereinabove, creates a plurality of historical UDC presence/absence (HUPA) maps 750, as described hereinabove.

Historical map generator 748 receives a UDC presence input from the UDC identifier 746 having a time stamp and also receives, from each CNC controller 724 of a plurality of corresponding CNC machining centers 725, at least one input providing current information indicating the tool currently being used in milling, the workpiece material being milled, the current depth of cut and the current rpm. On the basis of the aforesaid inputs, the historical map generator

748 creates a plurality of historical UDC presence/absence (HUPA) maps 750. It is a particular feature of an embodiment of the present invention that the HUPA maps 750 include depth of cut and rpm pairs for most or all instances where UDC did not occur. Preferably, but not necessarily, the HUPA maps 750 also include depth of cut and rpm pairs for most or all instances where UDC did occur.

For the purposes of the description which follows, each HUPA map 750 is specific to a given combination of workpiece material and type of tool, here designated WMTT and may be additionally specific to a given machine tool, here designated WMTTMT.

In accordance with one embodiment of the invention, similarly to the case described above with reference to FIGS. 1A-1C, each HUPA map 750 is machine tool specific as well and thus specific HUPA maps 750 are generated for each of the multiple machine tools in a shop. This is particularly relevant when the various CNC machining centers 725 are of different types or have different overall operating characteristics, which render them suitable for different machining tasks. In such a case, the generation of machine tool specific HUPA maps 750 is useful in enabling production planning and allocation of machining resources.

In accordance with another embodiment of the invention, as distinguished from the case described above with reference to FIGS. 1A-1C, non-machine tool specific HUPA (NMTSHUPA) maps 750 may be generated based on empirical data received from multiple machine tools having at least a predetermined level of similarity. For example, the multiple machine tools whose empirical data is used for generating a NMTSHUPA map 750 may be manufactured by different manufacturers but have the same power and speed capabilities. In another example, the multiple machine tools whose empirical data is used for generating a NMTSHUPA map 750 may be manufactured by the same manufacturer and have similar mechanical structures but have different spindle ratings. In a further example, the multiple machine tools whose empirical data is used for generating a NMTSHUPA map 750 may be manufactured by the same manufacturer or different manufacturers and have similar mechanical structures, rigidity, and ranges of movements along their various axes.

It is appreciated that separate NMTSHUPA maps 750 may be generated for a given WMTT based on various additional parameters including, for example a level of tool wear or a different threshold applicable to the definition of UDC. It is further appreciated that even more specific NMTSHUPA maps 750 may be generated for a given WMTT for each combination of a plurality of selectable machining parameters, for example, the corner radius of each cutting edge, the rake angle of each cutting edge, the flute helix angle of each cutting edge, the number of layers of inserts in an insert cutter, the number of inserts in each layer, the dimensions of each insert and the extent of overlap between layers of inserts.

It is appreciated that preferably, NMTSHUPA maps 750 are built up based on actual recorded microphone inputs from actual past machining operations on multiple workpieces. Thus, similarly to that described hereinabove with reference to FIG. 4, initially only a few pixels, representing specific depth of cut and rpm pairings, appear, here typically represented by a black solid pixel indicating the absence of UDC and preferably also by a cross-hatched pixel indicating the presence of UDC. These pairings represent actual depth of cut and rpm pairings of historical machining operations for a given type of tool and material using one or more CNC machining centers 725.

Over time, as more and more actual depth of cut and rpm pairings are utilized in actual machining carried out by CNC machining centers 725, more and more pixels in each HUPA map 750 are filled in, typically by a black solid pixel indicating the absence of UDC or by a cross-hatched pixel indicating the absence of UDC. The latest NMTSHUPA map 750 for each different WMTT is preferably stored in HED database 736 and is automatically consulted by the MCNCPG software 730, such as the IMACHINING® software, to validate the acceptability of the CNC program generated thereby.

A preferred methodology for this consultation is briefly summarized below:

The MCNCPG software 730 initially proposes a depth of cut/rpm pair;

If the depth of cut/rpm pair initially proposed by the MCNCPG software 730 corresponds to a black solid pixel, indicating that historically UDC was not encountered, the depth of cut/rpm pair is validated;

If the depth of cut/rpm pair initially proposed by the MCNCPG software 730 corresponds to a cross-hatched pixel, indicating that historically UDC was encountered, the depth of cut/rpm pair is disallowed;

If the depth of cut/rpm pair initially proposed by the MCNCPG software 730 does not correspond to a black solid pixel, which black solid pixel indicates that historically UDC was not encountered, and if the depth of cut/rpm pair initially proposed by the MCNCPG software 730 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 730 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 730 are cross-hatched pixels. If so, the depth of cut/rpm pair initially proposed by the MCNCPG software 730 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 730 are cross-hatched pixels. If so, the depth of cut/rpm pair initially proposed by the MCNCPG software 730 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 730 are not cross-hatched pixels. If so, the depth of cut/rpm pair initially proposed by the MCNCPG software 730 is not disallowed.

In a situation where the depth of cut/rpm pair proposed by the MCNCPG software 730 is neither validated nor disallowed, the system may proceed along one of the following operational paths:
1. Proceed to machine the workpiece using the depth of cut/rpm pair proposed by the MCNCPG software 730; or
2. Perform further analysis of the depth of cut/rpm pair proposed by the MCNCPG software 730.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 730 is validated.

If the next order neighborhood analysis does not result in validation of the depth of cut/rpm pair proposed by the MCNCPG software 730, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 730 is disallowed.

If the aforesaid further analysis does not result in either validation or disallowing of the depth of cut/rpm pair proposed by the MCNCPG software 730, preferably the system proceeds to machine the workpiece using the depth of cut/rpm pair proposed by the MCNCPG software 730.

More specifically, in accordance with a preferred embodiment of the present invention wherein CCM software 734 is provided, the TPG software 732 provides a proposed tool path output, defining for each machining operation: particulars of the tool, the depth of cut, the nominal feed speed and the tool trajectory, to the CCM software 734. The CCM software 734 provides, on the basis of the proposed tool path output, a cutting conditions output, defining for each machining operation: tool engagement angles for each point along the trajectory, the feed speed at each point along the trajectory and the rpm. The CCM software 734 and/or the TPG software 732 provide a UDC avoidance input to MHBUCA module 710 including for each machining operation: the WMTTMT, the depth of cut, and the rpm.

MHBUCA module 710 consults HED database 736, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, or are validated as described hereinabove, no change in the rpm is made by MHBUCA module 710.

If the pairings of depth of cut and rpm did historically produce UDC for the given WMTTMT, or are disallowed as described hereinabove, the rpm is considered to be UDC-problematic for the indicated depth of cut. Accordingly, a change in the rpm is proposed by MHBUCA module 710, based on the HED database 736, which contains the historical mappings indicating which pairings of depth of cut and rpm did not historically produce UDC for the given WMTT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 710, the proposed replacement rpm is output to the CCM software 734, which confirms that the replacement rpm is suitable for use for the given WMTTMT under the cutting conditions already established by the CCM software 734 for the given operation. This confirmation is provided by the CCM software 734 to the MCNCPG software 730, which provides a final, UDC-free CNC program output ready for loading onto the CNC controller 724 of a given machine tool, prior to commencement of machining.

In accordance with another preferred embodiment of the present invention wherein CCM software 734 is not provided, the MCNCPG software 730 provides a proposed CNC program output, defining for each machining operation: the WMTTMT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTTMT, the depth of cut and the rpm are supplied as a UDC avoidance input to MHBUCA module 710.

MHBUCA module 710 consults HED database 736, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, or are validated as described hereinabove, no change in the rpm is made by MHBUCA module 710.

If the pairings of depth of cut and rpm did historically produce UDC for the given WMTTMT, or are disallowed as described hereinabove, the rpm is considered to be UDC-problematic for the indicated depth of cut. Accordingly, a change in the rpm is proposed by MHBUCA module 710, based on the HED database 736, which contains the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Additionally or alternatively, where multiple machine tools having at least somewhat different characteristics are suitable and available for a given machining operation for a given WMTT and where HED database 736 contains multiple HUPA maps 750 corresponding to different available machine tools, the MHBUCA module 710 may select one or more specific machine tools from among all of the suitable and available machine tools to carry out the machining operation. Furthermore, the MHBUCA module 710 may select one or more specific machine tools from among all of the suitable and available machine tools which will carry out the given machining operation in an optimal manner not only from the perspective of UDC avoidance but also from the perspective of machining efficiency, such as machining cycle time.

Where a change in the rpm is proposed by the MHBUCA module 710, the proposed replacement rpm is output to the MCNCPG software 730, and preferably the operator confirms that the replacement rpm is suitable for use by the given tool and the given machine under the cutting conditions already established for the given operation. The MCNCPG software 730 provides a final UDC-free CNC program ready for loading onto the CNC controller 724 of each machine tool prior to commencement of machining.

It is appreciated that this embodiment of the present invention operates initially in a learning mode wherein most of the pixels in the HUPA maps 750, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given proposed non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, or if the proposed depth of cut and rpm pair is neither validated nor disallowed, the MCNCPG software 730 provides a final CNC program using the proposed depth of cut/rpm pair, ready for loading onto a given CNC controller 724 prior to commencement of machining.

It is a particular feature of the embodiment of the present invention described hereinabove with reference to FIG. 2B, that where the proposed depth of cut/rpm pair is neither validated nor disallowed based on machine tool specific HUPA maps 750, MHBUCA module 710 may consult non-machine tool specific HUPA maps 750 in HED database 736, which, being based on a relatively large number of machining events may be substantially more populated than corresponding machine tool specific HUPA maps 750.

When UDC occurs during machining, machining is automatically and immediately stopped and a new rpm is calculated by the MCNCPG software 730 in CNCPGCAM server 720, which rpm is believed, based on the information in the most up to date relevant HUPA map 750, to avoid UDC.

In cases where UDC does not occur for machining at a given depth of cut and rpm pairing for a given machine, tool and workpiece material, a corresponding pixel in an appropriate HUPA map 750 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 750 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 750, thus increasing the effectiveness of the system in predicting and thus avoiding UDC.

Figure 2C:
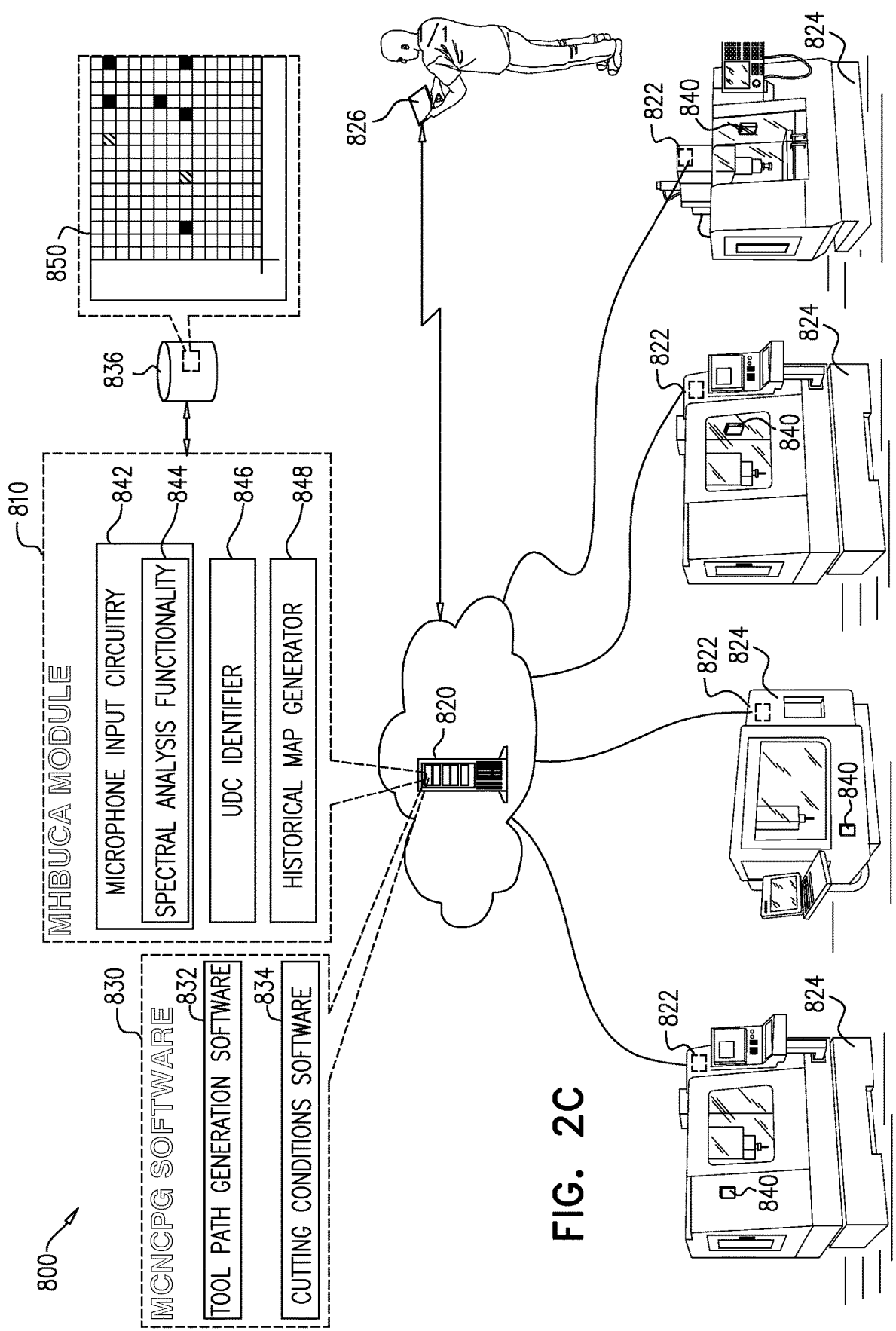
FIG. 2C is a simplified illustration of a 3-dimensional milling CNC program generation CAM and CNC milling system and methodology employing multiple machine tools and including at least one milling history-based undesirable chatter avoidance module, constructed and operative in accordance with one embodiment of the present invention, resident on at least one CNC program generation CAM server.

Reference is now made to FIG. 2C, which is a simplified illustration of a milling CNC program generation CAM and CNC milling system 800 and methodology including a milling history-based undesirable chatter (UDC) avoidance (MHBUCA) module 810, constructed and operative in accordance with yet another embodiment of the present invention. The embodiment of FIG. 2C is preferably a 3D system although alternatively it may be a 2.5D system. A CNC program generation CAM (CNCPGCAM) server 820 is preferably resident on the cloud and provides a CNC program, which is employed by one or more CNC controller 822 to operate one or more of a plurality of CNC milling machine such as CNC machining center 824. The CNC program includes inter alia, a tool path, spindle on/off commands, tool change commands, rpm commands, feed commands and coolant on/off commands. An operator may control operation of system 800 locally or remotely via a wireless device 826, such as an I-PAD.

The CNC program generation CAM server 820 may be any suitable CNC program generation CAM server and is preferably a server hosting milling CNC program generation (MCNCPG) software 830. The MCNCPG software 830 preferably includes tool path generation (TPG) software 832 and cutting conditions management (CCM) software 834.

A preferred type of milling CNC program generation (MCNCPG) software 830 is Solidcam™ milling CNC program generation software and includes cutting conditions management (CCM) software 834 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 2C is described hereinbelow with reference to CNC machining centers, it being understood that it is at least partially applicable to other types of CNC machine tools, such as mill/turn machines.

In accordance with a preferred embodiment of the present invention MHBUCA module 810 is preferably resident on the cloud and stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

MHBUCA module 810 employs empirical data obtained from machining activity on at least one workpiece material at an earlier time, which data is stored in a historical empirical data (HED) database 836, associated therewith, to generate and store historical mappings indicating which pairings of depth of cut and rpm produce or do not produce UDC when at least one given type of tool is used to machine at least one given type of workpiece material. HED database 836 is preferably also located on the cloud. It is a particular feature of an embodiment of the present invention that MHBUCA module 110 stores and utilizes pairs of depth of cut and rpm at which undesirable chatter (UDC) did not occur for past machining, using at least one given type of milling machine, at least one given type of cutting tool and at least one given type of workpiece material, in providing chatter avoidance.

In the illustrated embodiment of FIG. 2C, the historical empirical data is derived from earlier operation of one or more CNC machining centers 824 and is employed to generate subsequent UDC-free CNC programs for such CNC machining center 824, such that subsequent milling operation of the CNC machining centers 824 based on the CNC programs thus generated avoids UDC.

As in the embodiments of FIGS. 1A-2B, at least one microphone 840 is preferably mounted on each CNC machining center 824 and its output is supplied to microphone input circuitry 842, which preferably includes spectral analysis functionality 844. Microphone input circuitry 842 forms part of MHBUCA module 810, which preferably operates as described hereinabove and also includes a UDC identifier 846 which outputs to a historical map generator 848, which, as described hereinabove, creates a plurality of historical UDC presence/absence (HUPA) maps 850, as described hereinabove.

Historical map generator 848 receives a UDC presence input from the UDC identifier 846 having a time stamp and also receives, from each CNC controller 822 of a plurality of corresponding CNC machining centers 824, at least one input providing current information indicating the tool currently being used in milling, the workpiece material being milled, the current depth of cut and the current rpm. On the basis of the aforesaid inputs, the historical map generator 848 creates a plurality of historical UDC presence/absence (HUPA) maps 850. It is a particular feature of an embodiment of the present invention that the HUPA maps 850 include depth of cut and rpm pairs for most or all instances where UDC did not occur. Preferably, but not necessarily, the HUPA maps 850 also include depth of cut and rpm pairs for most or all instances where UDC did occur.

For the purposes of the description which follows, each HUPA map 850 is specific to a given combination of workpiece material and type of tool, here designated WMTT and may be additionally specific to a given machine tool, here designated WMTTMT.

In accordance with one embodiment of the invention, similarly to the case described above with reference to FIGS. 1A-1C, each HUPA map 850 is machine tool specific as well and thus specific HUPA maps 850 are generated for each of the multiple machine tools in a shop. This is particularly relevant when the various CNC machining centers 824 are of different types or have different overall operating characteristics, which render them suitable for different machining tasks. In such a case, the generation of machine tool specific HUPA maps 850 is useful in enabling production planning and allocation of machining resources.

In accordance with another embodiment of the invention, as distinguished from the case described above with reference to FIGS. 1A-1C, non-machine tool specific HUPA (NMTSHUPA) maps 850 may be generated based on empirical data received from multiple machine tools having at least a predetermined level of similarity. For example, the multiple machine tools whose empirical data is used for generating a NMTSHUPA map 850 may be manufactured by different manufacturers but have the same power and speed capabilities. In another example, the multiple machine tools whose empirical data is used for generating a NMTSHUPA map 850 may be manufactured by the same manufacturer and have similar mechanical structures but have different spindle ratings. In a further example, the multiple machine tools whose empirical data is used for generating NMT-SHUPA map 850 may be manufactured by the same manufacturer or different manufacturers and have similar mechanical structures, rigidity, and ranges of movements along their various axes.

It is appreciated that separate NMTSHUPA maps 850 may be generated for a given WMTT based on various additional parameters including, for example, a level of tool wear or a different threshold applicable to the definition of UDC. It is further appreciated that even more specific NMTSHUPA maps 850 may be generated for a given WMTT for each combination of a plurality of selectable machining parameters, for example, the corner radius of each cutting edge, the rake angle of each cutting edge, the flute helix angle of each cutting edge, the number of layers of inserts in an insert cutter, the number of inserts in each layer, the dimensions of each insert and the extent of overlap between layers of inserts.

It is appreciated that preferably, HUPA maps 850 are built up based on actual recorded microphone inputs from actual past machining operations on multiple workpieces. Thus, similarly to that described hereinabove with reference to FIG. 4, initially only a few pixels, representing specific depth of cut and rpm pairings, appear, here typically represented by a black solid pixel indicating the absence of UDC and preferably also by a cross-hatched pixel indicating the presence of UDC. These pairings represent actual depth of cut and rpm pairings of historical machining operations for a given type of tool and material using one or more CNC machining centers 824.

Over time, as more and more actual depth of cut and rpm pairings are utilized in actual machining carried out by CNC machining centers 824, more and more pixels in each HUPA map 850 are filled in, typically by a black solid pixel indicating the absence of UDC or by a cross-hatched pixel indicating the presence of UDC. The latest HUPA map 850 for each different WMTT is preferably stored in HED database 836 and is automatically consulted by the MCNCPG software 830, such as the IMACHINING® software, to validate the acceptability of the CNC program generated thereby.

A preferred methodology for this consultation is briefly summarized below:

The MCNCPG software 830 initially proposes a depth of cut/rpm pair;

If the depth of cut/rpm pair initially proposed by the MCNCPG software 830 corresponds to a black solid pixel, indicating that historically UDC was not encountered, the depth of cut/rpm pair is validated;

If the depth of cut/rpm pair initially proposed by the MCNCPG software 830 corresponds to a cross-hatched pixel, indicating that historically UDC was encountered, the depth of cut/rpm pair is disallowed;

If the depth of cut/rpm pair initially proposed by the MCNCPG software 830 does not correspond to a black solid pixel, which black solid pixel indicates that historically UDC was not encountered, and if the depth of cut/rpm pair initially proposed by the MCNCPG software 830 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 830 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 830 are cross-hatched pixels. If so, the depth of cut/rpm pair initially proposed by the MCNCPG software 830 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 830 are cross-hatched pixels. If so, the depth of cut/rpm pair initially proposed by the MCNCPG software 830 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 830 are not cross-hatched pixels. If so, the depth of cut/rpm pair initially proposed by the MCNCPG software 830 is not disallowed.

In a situation where the depth of cut/rpm pair proposed by the MCNCPG software 830 is neither validated nor disallowed, the system may proceed along one of the following operational paths:

1. Proceed to machine the workpiece using the depth of cut/rpm pair proposed by the MCNCPG software 830; or
2. Perform further analysis of the depth of cut/rpm pair proposed by the MCNCPG software 830.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 830 is validated.

If the next order neighborhood analysis does not result in validation of the depth of cut/rpm pair proposed by the MCNCPG software 830, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 830 is disallowed.

If the aforesaid further analysis does not result in either validation or disallowing of the depth of cut/rpm pair proposed by the MCNCPG software 830, preferably the system proceeds to machine the workpiece using the depth of cut/rpm pair proposed by the MCNCPG software 830.

More specifically, in accordance with a preferred embodiment of the present invention wherein CCM software 834 is provided, the TPG software 832 provides a proposed tool path output, defining for each machining operation: particulars of the tool, the depth of cut, the nominal feed speed and the tool trajectory, to the CCM software 834. The CCM software 834 provides, on the basis of the proposed tool path output, a cutting conditions output, defining for each machining operation: tool engagement angles for each point along the trajectory, the feed speed at each point along the trajectory and the rpm. The CCM software 834 and/or the TPG software 832 provide a UDC avoidance input to MHBUCA module 810 including for each machining operation: the WMTTMT, the depth of cut, and the rpm.

MHBUCA module 810 consults HED database 836, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, or are validated as described hereinabove, no change in the rpm is made by MHBUCA module 810.

If the pairings of depth of cut and rpm did historically produce UDC for the given WMTTMT, or are disallowed as described above, the rpm is considered to be UDC-problematic for the indicated depth of cut. Accordingly, a change in the rpm is proposed by MHBUCA module 810, based on HED database 836, which contains the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Where a change in the rpm is proposed by the MHBUCA module 810, the proposed replacement rpm is output to the CCM software 834, which confirms that the replacement rpm is suitable for use for the given WMTTMT under the cutting conditions already established by the CCM software 834 for the given operation. This confirmation is provided by the CCM software 834 to the MCNCPG software 830, which provides a final, UDC-free CNC program output ready for loading onto the CNC controller 822 of a given machine tool, prior to commencement of machining.

In accordance with another preferred embodiment of the present invention wherein CCM software 834 is not provided, the MCNCPG software 830 provides a proposed CNC program output, defining for each machining operation: the WMTTMT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTTMT, the depth of cut and the rpm are supplied as a UDC avoidance input to MHBUCA module 810.

MHBUCA module 810 consults HED database 836, associated therewith, which contains the historical mappings indicating which pairings of depth of cut and rpm do not produce UDC for the given WMTTMT and preferably also which pairings of depth of cut and rpm do produce UDC for the given WMTTMT.

If the pairings of depth of cut and rpm did not historically produce UDC for the given WMTTMT, or are validated as described hereinabove, no change in the rpm is made by MHBUCA module 810.

If the pairings of depth of cut and rpm did historically produce UDC for the given WMTTMT, or are disallowed as described hereinabove, the rpm is considered to be UDC-problematic for the indicated depth of cut. Accordingly, a change in the rpm is proposed by MHBUCA module 810, based on HED database 836, which contains the historical mappings indicating which pairings of depth of cut and rpm did not historically produce UDC for the given WMTTMT and preferably also indicating which pairings of depth of cut and rpm did historically produce UDC for the given WMTTMT. Preferably, an rpm which is higher than the UDC-problematic rpm is selected, however, there may be instances where an rpm which is lower than the UDC-problematic rpm is selected.

Additionally or alternatively, where multiple machine tools having at least somewhat different characteristics are suitable and available for a given machining operation for a given WMTT and where HED database 836 contains multiple HUPA maps 850 corresponding to different available machine tools, the MHBUCA module 810 may select one or more specific machine tools from among all of the suitable and available machine tools to carry out the machining operation. Furthermore, the MHBUCA module 810 may select one or more specific machine tools from among all of the suitable and available machine tools which will carry out the given machining operation in an optimal manner not only from the perspective of UDC avoidance but also from the perspective of machining efficiency, such as machining cycle time.

Where a change in the rpm is proposed by the MHBUCA module 810, the proposed replacement rpm is output to the MCNCPG software 830, and preferably the operator confirms that the replacement rpm is suitable for use by the given tool and the given machine under the cutting conditions already established for the given operation. The MCNCPG software 830 provides a final UDC-free CNC program ready for loading onto the CNC controller 822 of each machine tool prior to commencement of machining.

It is appreciated that this embodiment of the present invention operates initially in a learning mode wherein most of the pixels in the HUPA maps 850, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given proposed non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, or if the proposed depth of cut/rpm pair is neither validated nor disallowed, the MCNCPG software 830 provides a final CNC program using the proposed depth of cut/rpm pair, ready for loading onto a given CNC controller 822 prior to commencement of machining.

It is a particular feature of the embodiment of the present invention described hereinabove with reference to FIG. 2C, that where the proposed depth of cut/rpm pair is neither validated nor disallowed based on machine tool specific HUPA maps 850, MHBUCA module 810 may consult non-machine tool specific HUPA maps 850 in HED database 836, which, being based on a relatively large number of machining events, may be substantially more populated than corresponding machine tool specific HUPA maps 850.

When UDC occurs during machining, machining is automatically and immediately stopped and a new rpm is calculated by the MCNCPG software 830 in CNCPGCAM server 820, which rpm is believed, based on the information in the most up to date relevant HUPA map 850, to avoid UDC.

In cases where UDC does not occur for machining at a given depth of cut and rpm pairing for a given machine, tool and workpiece material, a corresponding pixel in an appropriate HUPA map 850 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 850 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 850, thus increasing the effectiveness of the system in predicting and thus avoiding UDC.

Figure 3A:
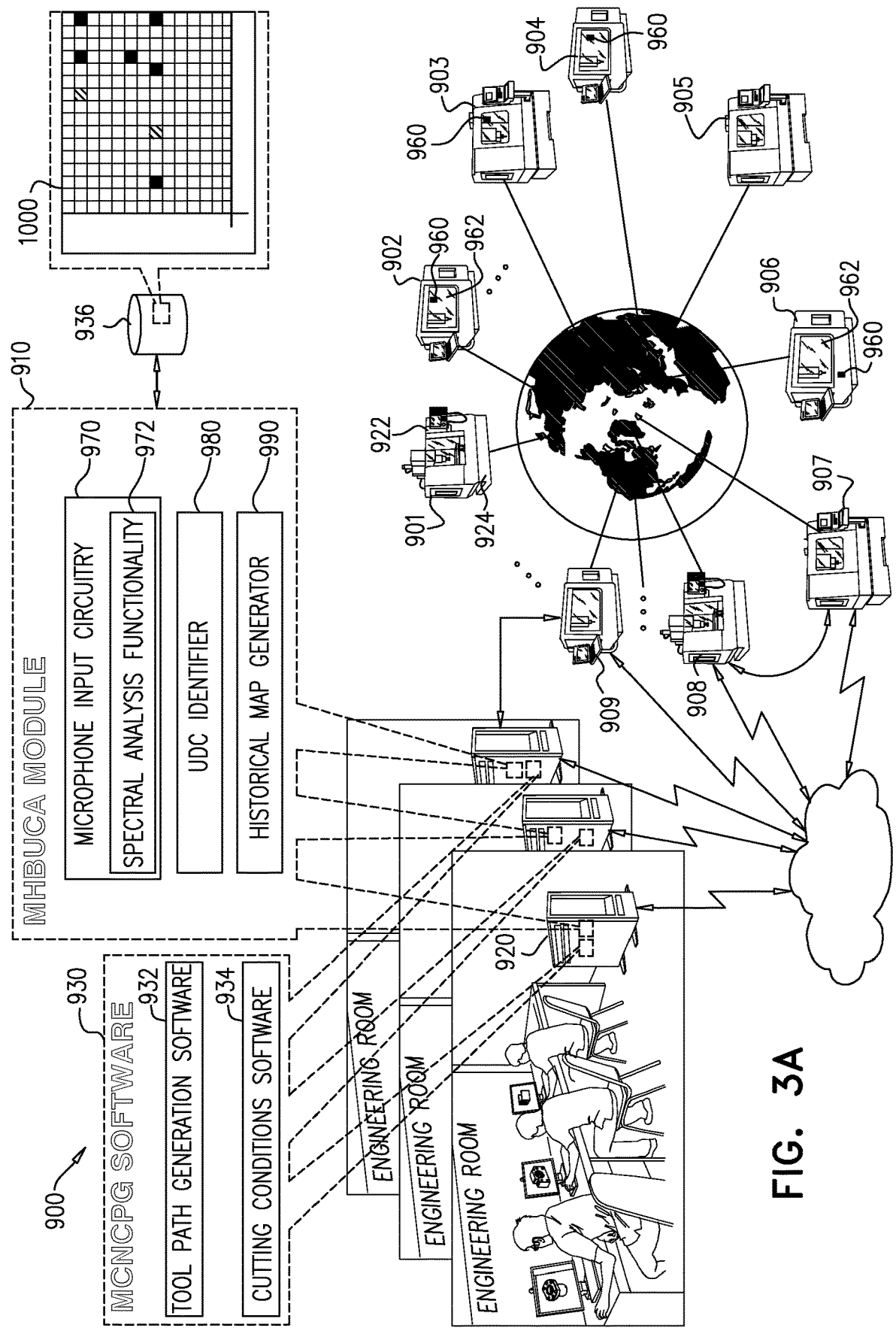
FIG. 3A is a simplified illustration of a milling CNC program generation CAM and CNC milling system and methodology employing a multiplicity of machine tools, typically of various different types, and preferably including a plurality of milling history-based undesirable chatter avoidance modules, at least one of which is resident on at least one CNC program generation CAM server, constructed and operative in accordance with yet another embodiment of the present invention.

Reference is now made to FIG. 3A, which is a simplified illustration of a milling CNC program generation CAM and CNC milling system and methodology employing a multiplicity of machine tools, typically of various different types, and preferably including a plurality of milling history-based undesirable chatter avoidance modules, at least one of which is resident on at least one CNC program generation CAM server, constructed and operative in accordance with yet another embodiment of the present invention.

FIG. 3A shows a milling CNC program generation CAM and CNC milling system 900 and methodology employing a large number of machine tools, typically of different types, made by different manufacturers and here designated by reference numerals 901, 902, 903, 904, 905, 906, 907, 908, and 909. The machine tools are distributed over a multiplicity of workshops, which are located geographically throughout the world. In one realization of this embodiment of the invention, the machine tools are all managed by a single organization, such as, for example, an aircraft manufacturing company, which manufactures aircraft parts in multiple facilities throughout the world. In another realization of this embodiment of the invention the machine tools are managed by different entities.

System 900 preferably comprises one or more milling history-based undesirable chatter avoidance (MHBUCA) module 910, constructed and operative in accordance with one embodiment of the present invention, preferably resident on one or more CNC program generation CAM (CNCPGCAM) server 920. The CNCPGCAM servers 920 each provide a CNC program which is supplied to at least one CNC controller 922 of one or more CNC milling machines, such as CNC machining centers 924. The CNC program preferably includes, inter alia, a tool path, spindle on/off commands, tool change commands, rpm commands, feed commands and coolant on/off commands.

In one realization of this embodiment of the invention, each organization may have one or more MHBUCA module 910 and corresponding CNCPGCAM servers 920, which communicate only with machine tools managed by that organization. In another realization of this embodiment of the invention one or more MHBUCA modules 910 and corresponding CNCPGCAM servers 920 may be provided, which may communicate with machine tools of more than one organization or entity.

Each CNCPGCAM server 920 may be any suitable CNC program generation CAM server and is preferably a server hosting milling CNC program generation (MCNCPG) software 930. The MCNCPG software 930 preferably includes tool path generation (TPG) software 932 and cutting conditions management (CCM) software 934.

A preferred type of MCNCPG software 930 is Solidcam™ milling CNC program generation software and includes cutting conditions management software 934 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 3A is described hereinbelow with reference to CNC machining centers, it being understood that it is at least partially applicable to other types of CNC machine tools, such as mill/turn machines.

In accordance with a preferred embodiment of the present invention, MHBUCA module 910 stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

In the embodiment of FIG. 3A, the MCNCPG software 930 in each CNCPGCAM server 920 is located in an engineering room wherein production engineers interact with the CNCPGCAM server 920 to generate the CNC programs which are downloaded to the CNC controller 922 of each one of multiple CNC machining centers 924, which may or may not be located at a common location.

In accordance with this embodiment of the invention, the MHBUCA module 910 employs empirical data obtained from machining activity carried out on multiple machines, at various disparate locations, on at least one workpiece material at an earlier time, which data is stored in at least one historical empirical data (HED) database 936, to generate and store historical mappings indicating which pairings of depth of cut and rpm produce or do not produce tool undesirable chatter (UDC) when at least one given type of tool is used to machine at least one given type of workpiece material. It is a particular feature of an embodiment of the present invention that the MHBUCA module 910 stores and utilizes pairs of depth of cut and rpm at which undesirable chatter (UDC) did not occur for past machining, using at least one given type of milling machine, at least one given type of cutting tool and at least one given type of workpiece material, in providing chatter avoidance.

In one realization of this embodiment, each MHBUCA module 910 receives empirical data originating from machines all belonging to a single organization. In another realization of this embodiment, at least one MHBUCA module 910 receives empirical data originating from machines belonging to multiple organizations and entities. In both of the above realizations, each MHBUCA module 910 receives empirical data originating from machines of the same type, manufactured by a same manufacturer or alternatively receives empirical data from machines of different types, manufactured by a same manufacturer. As a further alternative, at least one MHBUCA module 910 receives empirical data from machines of different types, manufactured by different manufacturers.

In a further realization of this embodiment of the invention, which is not mutually exclusive to the realizations described in the preceding paragraph, each organization may have one or more MHBUCA module 910 and corresponding CNCPGCAM servers 920, which may provide NMTSHUPA maps for use by machine tools managed by that organization. In another further realization of this embodiment of the invention, which is not mutually exclusive to the realizations described in the preceding paragraph, one or more MHBUCA modules 910 and corresponding CNCPGCAM servers 920 may be provided, which may provide NMTSHUPA maps for use by machine tools of more than one organization or entity.

In the illustrated embodiment of FIG. 3A, the historical empirical data is derived from earlier operation of one or more CNC machining center 924 and is employed to generate subsequent UDC-free CNC programs for one or more CNC machining center 924, such that milling operation of the CNC machining centers 924 based on the CNC programs thus generated avoids UDC.

In accordance with a preferred embodiment of the invention, one or more microphone 960 is mounted on each CNC machining center 924, such as within the machining chamber 962 of the CNC machining center 924 or on an outer housing thereof. Each CNC machining center 924 also typically includes CNC controller 922. An output of microphone 960 is supplied to microphone input circuitry 970, and which may include spectral analysis functionality 972, such as Fast Fourier Transformation (FFT) functionality, which transforms the microphone output, which is in the time domain, to the frequency domain.

An output of the microphone input circuitry 970, which preferably includes the spectral analysis functionality 972, is in the frequency domain and is supplied to a UDC identifier 980 which identifies peaks in the frequency domain, which are not coincident with any of the harmonic peaks characteristic of the tooth passing frequency. If such peaks exceed a given height, corresponding to a predetermined amplitude threshold characterizing UDC, the presence of UDC is identified.

In accordance with one embodiment of the invention, microphone input circuitry 970, spectral analysis functionality 972 and UDC identifier 980 may be provided at each machine tool. Alternatively, the microphone input circuitry 970 may be provided at each machine tool and the spectral analysis functionality 972 and UDC identifier 980 may be provided as part of at least one MHBUCA module 910. As a further alternative, microphone input circuitry 970, spectral analysis functionality 972 and UDC identifier 980 may all be provided as part of at least one MHBUCA module 910.

A historical map generator 990 receives a UDC presence input from at least one UDC identifier 980 having a time stamp and also receives from the CNC controller 922 of the corresponding CNC machining center 924 at least one input providing current information indicating the tool currently being used in milling, the workpiece material being milled, the current depth of cut and the current rpm. On the basis of the aforesaid inputs, the historical map generator 990 creates a plurality of historical UDC presence/absence (HUPA) maps 1000. It is a particular feature of an embodiment of the present invention that the HUPA maps 1000 include depth of cut and rpm pairs for most or all instances where UDC did not occur. Preferably, but not necessarily, the HUPA maps 1000 also include depth of cut and rpm pairs for most or all instances where UDC did occur.

In accordance with one embodiment of the invention, historical map generator 990 receives a UDC presence input from at least one UDC identifier 980 based on empirical data originating from machines all belonging to a single organization. In another embodiment, historical map generator 990 receives a UDC presence input from at least one UDC identifier 980 based on empirical data originating from machines belonging to multiple organizations and entities. In both of the above embodiments, historical map generator 990 receives a UDC presence input from at least one UDC identifier 980 based on empirical data originating from machines of the same type, manufactured by a same manufacturer or alternatively based on empirical data from machines of different types, manufactured by a same manufacturer. As a further alternative, historical map generator 990 receives a UDC presence input from at least one UDC identifier 980 based on empirical data from machines of different types, manufactured by different manufacturers.

In accordance with an embodiment of the present application, each HUPA map 1000 is specific at least to a given combination of workpiece material and type of tool, here designated WMTT.

In accordance with one embodiment of the invention, at least one HUPA map 1000 is based on empirical data originating from machines all belonging to a single organization. In another embodiment, at least one HUPA map 1000 is based on empirical data originating from machines belonging to multiple organizations and entities. In both of the above embodiments, at least one HUPA map 1000 is based on empirical data originating from machines of the same type, manufactured by a same manufacturer or alternatively based on empirical data from machines of different types, manufactured by a same manufacturer. As a further alternative, at least one HUPA map 1000 is based on empirical data from machines of different types, manufactured by different manufacturers.

In accordance with one embodiment of the invention, similarly to the case described above with reference to FIGS. 1A-1C, each HUPA map 1000 is machine tool specific as well and thus HUPA maps 1000 are generated for each of the multiple machine tools communicating with the system. This is particularly relevant when the various CNC machining centers 924 are of different types or have different overall operating characteristics, which render them suitable for different machining tasks. In such a case, the generation of machine tool specific HUPA maps 1000 is useful in enabling production planning and allocation of machining resources. The tool specific HUPA maps 1000 are each based on empirical data relating to a combination of workpiece material, type of tool and machine tool, here designated WMTTMT.

In accordance with another embodiment of the invention, as distinguished from the case described above with reference to FIGS. 1A-1C, non-machine tool specific HUPA (NMTSHUPA) maps 1000 may be generated based on empirical data received from multiple machine tools having at least a predetermined level of similarity. For example, the multiple machine tools whose empirical data is used for generating a NMTSHUPA map 1000 may be manufactured by different manufacturers but have the same power and speed capabilities. In another example, the multiple machine tools whose empirical data is used for generating a NMTSHUPA map 1000 may be manufactured by the same manufacturer and have similar mechanical structures but have different spindle ratings. In a further example, the multiple machine tools whose empirical data is used for generating a NMTSHUPA map 1000 may be manufactured by the same manufacturer or different manufacturers and have similar mechanical structures, rigidity, and ranges of movements along their various axes.

It is appreciated that separate NMTSHUPA maps 1000 may be generated for a given WMTT based on various additional parameters including, for example, a level of tool wear or a different threshold applicable to the definition of UDC. It is further appreciated that even more specific NMTSHUPA maps 1000 may be generated for a given WMTT for each combination of a plurality of selectable machining parameters, for example, the corner radius of each cutting edge, the rake angle of each cutting edge, the flute helix angle of each cutting edge, the number of layers of inserts in an insert cutter, the number of inserts in each layer, the dimensions of each insert and the extent of overlap between layers of inserts.

It is appreciated that preferably, the NMTSHUPA maps 1000 are built up based on actual recorded microphone inputs from actual past machining operations on multiple workpieces. Thus, similarly to that described hereinabove with reference to FIG. 4, initially only a few pixels, representing specific depth of cut and rpm pairings, appear, here typically represented by a black solid pixel indicating the absence of UDC and preferably also by a cross-hatched pixel indicating the presence of UDC. These pairings represent actual depth of cut and rpm pairings of historical machining operations for a given type of tool and material using one or more CNC machining centers 924.

Over time, as more and more actual depth of cut and rpm pairings are utilized in actual machining carried out by CNC machining centers 924, more and more pixels in each NMTSHUPA map 1000 are filled in, typically by a black solid pixel indicating the absence of UDC or by a cross-hatched pixel indicating the presence of UDC. The latest NMTSHUPA map 1000 for each different WMTT is preferably stored in historical empirical data (HED) database 936 and is automatically consulted by the MCNCPG software 930, such as the IMACHINING® software, to validate the acceptability of the CNC program generated thereby.

A preferred methodology for this consultation is briefly summarized below:

The MCNCPG software 930 initially proposes a depth of cut/rpm pair;

If the depth of cut/rpm pair initially proposed by the MCNCPG software 930 corresponds to a black solid pixel, indicating that historically UDC was not encountered, the depth of cut/rpm pair is validated;

If the depth of cut/rpm pair initially proposed by the MCNCPG software 930 corresponds to a cross-hatched pixel, indicating that historically UDC was encountered, the depth of cut/rpm pair is disallowed;

If the depth of cut/rpm pair initially proposed by the MCNCPG software 930 does not correspond to a black solid pixel, which black solid pixel indicates that historically UDC was not encountered, and if the depth of cut/rpm pair initially proposed by the MCNCPG software 930 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 930 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 930 are cross-hatched pixels. If so, the depth of cut/rpm pair initially proposed by the MCNCPG software 930 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 930 are cross-hatched pixels. If so, the depth of cut/rpm pair initially proposed by the MCNCPG software 930 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 930 are not cross-hatched pixels. If so, the depth of cut/rpm pair initially proposed by the MCNCPG software 930 is not disallowed.

In a situation where the depth of cut/rpm pair proposed by the MCNCPG software 930 is neither validated nor disallowed, the system may proceed along one of the following operational paths:
1. Proceed to machine the workpiece using the depth of cut/rpm pair proposed by the MCNCPG software 930; or
2. Perform further analysis of the depth of cut/rpm pair proposed by the MCNCPG software 930.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 930 is validated.

If the next order neighborhood analysis does not result in validation of the depth of cut/rpm pair proposed by the MCNCPG software 930, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 930 is disallowed.

If the aforesaid further analysis does not result in either validation or disallowing of the depth of cut/rpm pair proposed by the MCNCPG software 930, preferably the system proceeds to machine the workpiece using the depth of cut/rpm pair proposed by the MCNCPG software 930.

More specifically, in accordance with a preferred embodiment of the present invention wherein CCM software 934 is provided, the TPG software 932 provides a proposed tool path output, defining for each machining operation: particulars of the tool, the depth of cut, the nominal feed speed and the tool trajectory, to the CCM software 934. The CCM software 934 provides, on the basis of the proposed tool path output, a cutting conditions output, defining for each machining operation: tool engagement angles for each point along the trajectory, the feed speed at each point along the trajectory and the rpm. The CCM software 934 and/or the TPG software 932 provide an undesirable chatter (UDC) avoidance input to milling history-based undesirable chatter (UDC) avoidance (MHBUCA) module 910 including for each machining operation: the WMTTMT, the depth of cut, and the rpm.

MHBUCA module 910 consults HED database 936, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described hereinabove, no change in the rpm is made by MHBUCA module 910.

If the pairings of depth of cut and rpm did historically produce UDC for the given WMTT, or are disallowed as described hereinabove, the rpm is considered to be UDC-problematic for the indicated depth of cut. Accordingly, a change in the rpm is proposed by MHBUCA module 910, based on the HED database 936, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Where a change in the rpm is proposed by the MHBUCA module 910, the proposed replacement rpm is output to the CCM software 934, which confirms that the replacement rpm is suitable for use for the given WMTT under the cutting conditions already established by the CCM software 934 for the given operation. This confirmation is provided by the CCM software 934 to the MCNCPG software 930, which provides a final, UDC-free CNC program output ready for loading onto the CNC controller 922 of a given machine tool, prior to commencement of machining.

In accordance with another preferred embodiment of the present invention wherein CCM software 934 is not provided, the MCNCPG software 930 provides a proposed CNC program output, defining for each machining operation: the WMTT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTT, the depth of cut and the rpm are supplied as a UDC avoidance input to MHBUCA module 910.

MHBUCA module 910 consults HED database 936, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described hereinabove, no change in the rpm is made by MHBUCA module 910.

If the pairings of depth of cut and rpm did historically produce UDC for the given WMTT, or are disallowed as described hereinabove, the rpm is considered to be UDC-problematic for the indicated depth of cut. Accordingly, a change in the rpm is proposed by MHBUCA module 910, based on the HED database 936, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Additionally or alternatively, where multiple machine tools having at least somewhat different characteristics are suitable and available for a given machining operation for a given WMTT and where HED database 936 contains multiple HUPA maps 1000 corresponding to different available machine tools, the MHBUCA module 910 may select one or more specific machine tools from among all of the suitable and available machine tools to carry out the machining operation. Furthermore, the MHBUCA module 910 may select one or more specific machine tools from among all of the suitable and available machine tools which will carry out the given machining operation in an optimal manner not only from the perspective of UDC avoidance but also from the perspective of machining efficiency, such as machining cycle time.

Where a change in the rpm is proposed by the MHBUCA module 910, the proposed replacement rpm is output to the MCNCPG software 930, and preferably the operator confirms that the replacement rpm is suitable for use by the given tool and the given machine under the cutting conditions already established for the given operation. The MCNCPG software 930 provides a final UDC-free CNC program ready for loading onto the CNC controller 922 prior to commencement of machining.

It is appreciated that this embodiment of the present invention operates initially in a learning mode wherein most of the pixels in the HUPA maps 1000, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given proposed non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, or if the proposed depth of cut/rpm pair is neither validated nor disallowed, the MCNCPG software 930 provides a final CNC program using the proposed depth of cut/rpm pair, ready for loading onto the CNC controller 922 prior to commencement of machining.

It is a particular feature of the embodiment of the present invention described hereinabove with reference to FIG. 3A, that where the proposed depth of cut/rpm pair is neither validated nor disallowed based on machine tool specific HUPA maps 1000, MHBUCA module 910 may consult non-machine tool specific HUPA maps 1000 in HED database 936, which, being based on a relatively large number of machining events, may be substantially more populated than corresponding machine tool specific HUPA maps 1000.

It is a particular feature of an embodiment of the present invention that various types of HUPA maps 1000 may be provided. These include, for example:

A. a machine tool specific HUPA map 1000 which is based on historical empirical data from a given machine tool;

B. a machine tool type specific HUPA map 1000, which is based on historical empirical data received from multiple machine tools of a given type;

C. a machine tool manufacturer specific HUPA map 1000, which is based on historical empirical data received from multiple machine tools made by a given manufacturer;

D. a machine tool characteristic specific HUPA map 1000, which is based on historical empirical data received from multiple machine tools having at least one given structural or operational characteristic.

Various additional types of HUPA maps 1000 may be additionally or alternatively provided.

It is appreciated that type A HUPA maps 1000 are the most reliable for UDC prediction for the given machine tool to which they relate and that typically type B-type D HUPA maps 1000 are typically less reliable for UDC prediction. Accordingly, normally MHBUCA module 910 will inquire as to whether a pixel associated with a given depth of cut/rpm is indicated to be UDC free on the type A HUPA map 1000 relating to the given machine tool. If a pixel associated with a given depth of cut/rpm is indicated to be UDC free on the type A HUPA map 1000, no further inquiry is required.

If however, the historical map generator 990 is at a relatively early learning phase with respect to the relevant type A HUPA map 1000 and thus a pixel associated with a given depth of cut/rpm and pixels having similar rpms for the same depth of cut are not indicated to be UDC free on the type A HUPA map 1000, the MHBUCA module 910 may consider HUPA maps 1000 of types B, C and D or other suitable HUPA maps 1000.

When UDC occurs during machining, machining is automatically and immediately stopped and a new rpm is calculated by the MCNCPG software 930 in CNCPGCAM server 920, which rpm is believed, based on the information in the most up to date relevant HUPA map 1000, to avoid UDC.

In cases where UDC does not occur for machining at a given depth of cut and rpm pairing for a given machine, tool and workpiece material, a corresponding pixel in an appropriate HUPA map 1000 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 1000 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 1000, thus increasing the effectiveness of the system in predicting and thus avoiding UDC.

Figure 3B:
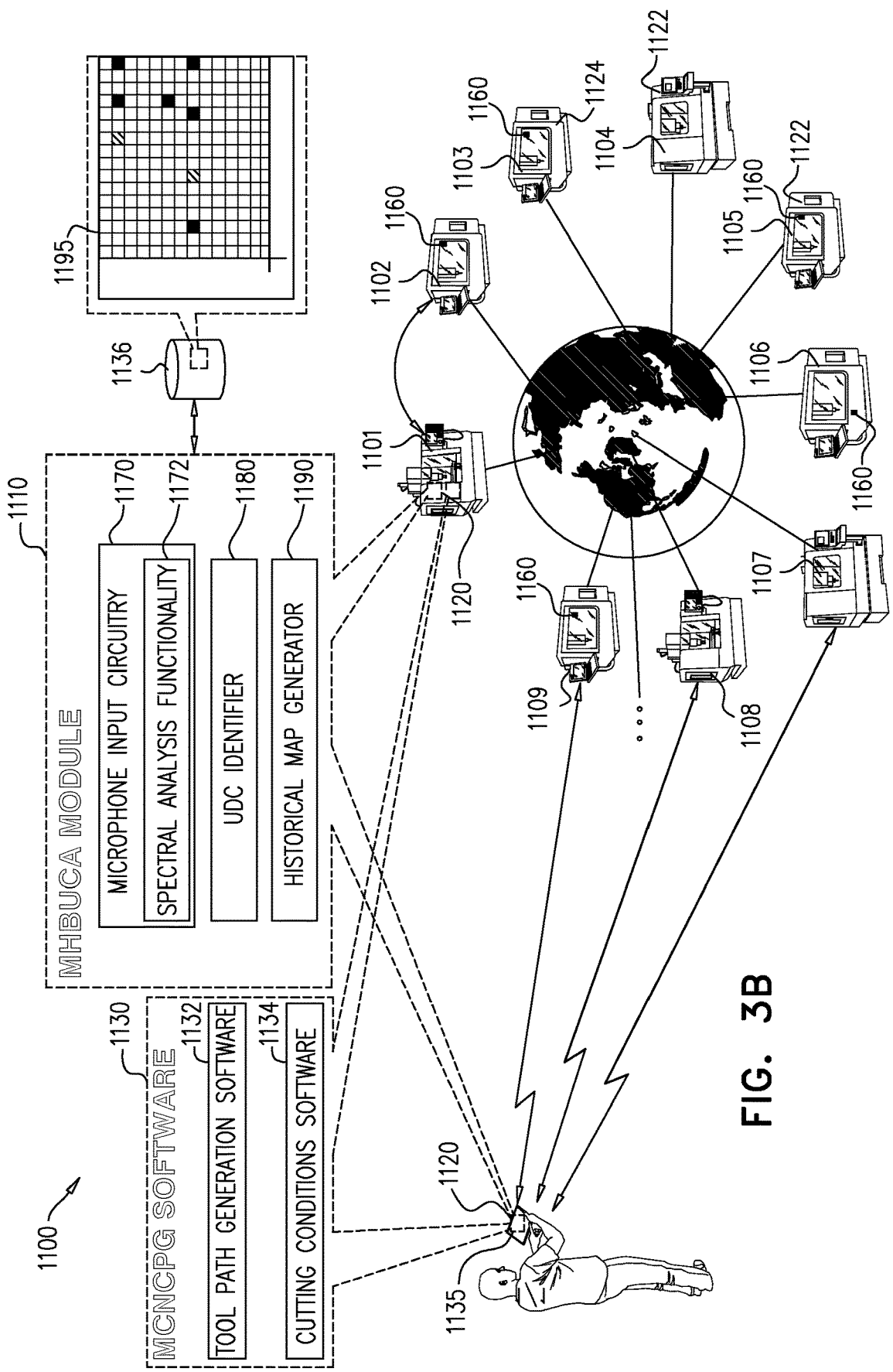
FIG. 3B is a simplified illustration of a milling CNC program generation CAM and CNC milling system and methodology employing a multiplicity of machine tools, typically of various different types, and including a plurality of milling history-based undesirable chatter avoidance modules, at least one of which is resident on at least one a CNC program generation CAM server, constructed and operative in accordance with yet another embodiment of the present invention.

Reference is now made to FIG. 3B, which is a simplified illustration of a milling CNC program generation CAM and CNC milling system and methodology employing a multiplicity of machine tools, typically of various different types, and preferably including a plurality of milling history-based undesirable chatter avoidance modules, at least one of which is resident on at least one CNC program generation CAM server.

FIG. 3B shows a milling CNC program generation CAM and CNC milling system 1100 and methodology employing a large number of machine tools, typically of different types, made by different manufacturers and here designated by reference numerals 1101, 1102, 1103, 1104, 1105, 1106, 1107, 1108, and 1109. The machine tools are distributed over a multiplicity of workshops, which are located geographically throughout the world. In one realization of this embodiment of the invention, the machine tools are all managed by a single organization, such as, for example, an aircraft manufacturing company, which manufactures aircraft parts in multiple facilities throughout the world. In another realization of this embodiment of the invention the machine tools are managed by different entities.

System 1100 preferably comprises multiple milling history-based undesirable chatter avoidance (MHBUCA) modules 1110, constructed and operative in accordance with one embodiment of the present invention, preferably resident on multiple CNCPGCAM servers 1120. The CNCPGCAM servers 1120 each provide a CNC program which is supplied to at least one CNC controller 1122 of one or more CNC milling machines, such as machining centers 1124. The CNC program preferably includes, inter alia, a tool path, spindle on/off commands, tool change commands, rpm commands, feed commands and coolant on/off commands.

In one realization of this embodiment of the invention, each organization may have one or more MHBUCA module 1110 and corresponding CNCPGCAM servers 1120, which receive empirical data only from machine tools managed by that organization. In another realization of this embodiment of the invention one or more MHBUCA modules 1110 and corresponding CNCPGCAM servers 1120 may be provided, which may receive empirical data from machine tools of more than one organization or entity.

In a further realization of this embodiment of the invention, which is not mutually exclusive to the realizations described in the preceding paragraph, each organization may have one or more MHBUCA module 1110 and corresponding CNCPGCAM servers 1120, which may provide NMTSHUPA maps for use by machine tools managed by that organization. In another further realization of this embodiment of the invention, which is not mutually exclusive to the realizations described in the preceding paragraph, one or more MHBUCA modules 1110 and corresponding CNCPGCAM servers 1120 may be provided, which may provide NMTSHUPA maps for use by machine tools of more than one organization or entity.

Each CNCPGCAM server 1120 may be any suitable CNC program generation CAM server and is preferably a server hosting milling CNC program generation (MCNCPG) software 1130. The MCNCPG software 1130 preferably includes tool path generation (TPG) software 1132 and cutting conditions management (CCM) software 1134.

A preferred type of MCNCPG software 1130 is Solidcam™ milling CNC program generation software and includes cutting conditions management software 1134 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 3B is described hereinbelow with reference to CNC machining centers, it being understood that it is at least partially applicable to other types of CNC machine tools, such as mill/turn machines.

In accordance with a preferred embodiment of the present invention, MHBUCA module 1110 stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

In the embodiment of FIG. 3B, the MCNCPG software 1130 and each CNCPGCAM server 1120 are located on one or more computer, such as a portable notebook computer 1135, used by production engineers to generate the CNC programs which are downloaded to the CNC controller 1122 of each one of multiple CNC machining centers 1124, which may or may not be located at a common location.

In accordance with this embodiment of the invention, the MHBUCA module 1110 employs empirical data obtained from machining activity carried out on multiple machines, at various disparate locations, on at least one workpiece material at an earlier time, which data is stored in at least one historical empirical data (HED) database 1136, to generate and store historical mappings indicating which pairings of depth of cut and rpm produce or do not produce tool undesirable chatter (UDC) when at least one given type of tool is used to machine at least one given type of workpiece material. It is a particular feature of an embodiment of the present invention that the MHBUCA module 1110 stores and utilizes pairs of depth of cut and rpm at which undesirable chatter (UDC) did not occur for past machining, using at least one given type of milling machine, at least one given type of cutting tool and at least one given type of workpiece material, in providing chatter avoidance.

In one realization of this embodiment, each MHBUCA module 1110 receives empirical data originating from machines all belonging to a single organization. In another realization of this embodiment, at least one MHBUCA module 1110 receives empirical data originating from machines belonging to multiple organizations and entities. In both of the above realizations, each MHBUCA module 1110 receives empirical data originating from machines of the same type, manufactured by a same manufacturer or alternatively receives empirical data from machines of different types, manufactured by a same manufacturer. As a further alternative, at least one MHBUCA module 1110 receives empirical data from machines of different types, manufactured by different manufacturers.

In the illustrated embodiment of FIG. 3B, the historical empirical data is derived from earlier operation of one or more CNC machining center 1124 and is employed to generate subsequent UDC-free CNC programs for one or more CNC machining center 1124, such that milling operation of the CNC machining centers 1124 based on the CNC programs thus generated avoids UDC.

In accordance with a preferred embodiment of the invention, one or more microphone 1160 is mounted on each CNC machining center 1124, such as within the machining chamber 1162 of the CNC machining center 1124 or on an outer housing thereof. Each CNC machining center 1124 also typically includes CNC controller 1122. An output of microphone 1160 is supplied to microphone input circuitry 1170, and which may include spectral analysis functionality 1172, such as Fast Fourier Transformation (FFT) functionality, which transforms the microphone output, which is in the time domain, to the frequency domain.

An output of the microphone input circuitry 1170, which preferably includes the spectral analysis functionality 1172, is in the frequency domain and is supplied to a UDC identifier 1180 which identifies peaks in the frequency domain, which are not coincident with any of the harmonic peaks characteristic of the tooth passing frequency. If such peaks exceed a given height, corresponding to a predetermined amplitude threshold characterizing UDC, the presence of UDC is identified.

In accordance with one embodiment of the invention, microphone input circuitry 1170, spectral analysis functionality 1172 and UDC identifier 1180 may be provided at each machine tool. Alternatively, the microphone input circuitry 1170 may be provided at each machine tool and the spectral analysis functionality 1172 and UDC identifier 1180 may be provided as part of at least one MHBUCA module 1110. As a further alternative, microphone input circuitry 1170, spectral analysis functionality 1172 and UDC identifier 1180 may all be provided as part of at least one MHBUCA module 1110.

A historical map generator 1190 receives a UDC presence input from at least one UDC identifier 1180 having a time stamp and also receives, from the CNC controller 1122 of the corresponding CNC machining center 1124, at least one input providing current information indicating the tool currently being used in milling, the workpiece material being milled, the current depth of cut and the current rpm. On the basis of the aforesaid inputs, the historical map generator 1190 creates a plurality of historical UDC presence/absence (HUPA) maps 1195. It is a particular feature of an embodiment of the present invention that the HUPA maps 1195 include depth of cut and rpm pairs for most or all instances where UDC did not occur. Preferably, but not necessarily, the HUPA maps 1195 also include depth of cut and rpm pairs for most or all instances where UDC did occur.

In accordance with one embodiment of the invention, historical map generator 1190 receives a UDC presence input from at least one UDC identifier 1180 based on empirical data originating from machines all belonging to a single organization. In another embodiment, historical map generator 1190 receives a UDC presence input from at least one UDC identifier 1180 based on empirical data originating from machines belonging to multiple organizations and entities. In both of the above embodiments, historical map generator 1190 receives UDC presence input from at least one UDC identifier 1180 based on empirical data originating from machines of the same type, manufactured by a same manufacturer or alternatively based on empirical data from machines of different types, manufactured by a same manufacturer. As a further alternative, historical map generator 1190 receives a UDC presence input from at least one UDC identifier 1180 based on empirical data from machines of different types, manufactured by different manufacturers.

In accordance with an embodiment of the present application, each HUPA map 1195 is specific at least to a given combination of workpiece material and type of tool, here designated WMTT.

In accordance with one embodiment of the invention, at least one HUPA map 1195 is based on empirical data originating from machines all belonging to a single organization. In another embodiment, at least one HUPA map 1195 is based on empirical data originating from machines belonging to multiple organizations and entities. In both of the above embodiments, at least one HUPA map 1195 is based on empirical data originating from machines of the same type, manufactured by a same manufacturer or alternatively based on empirical data from machines of different types, manufactured by a same manufacturer. As a further alternative, at least one HUPA map 1195 is based on empirical data from machines of different types, manufactured by different manufacturers.

In accordance with one embodiment of the invention, similarly to the case described above with reference to FIGS. 1A-1C, each HUPA map 1195 is machine tool specific as well and thus HUPA maps 1195 are generated for each of the multiple machine tools communicating with the system. This is particularly relevant when the various CNC machining centers 1124 are of different types or have different overall operating characteristics, which render them suitable for different machining tasks. In such a case, the generation of machine tool specific HUPA maps 1195 is useful in enabling production planning and allocation of machining resources. The tool specific HUPA maps 1195 are each based on empirical data relating to a combination of workpiece material, type of tool and machine tool, here designated WMTTMT.

In accordance with another embodiment of the invention, as distinguished from the case described above with reference to FIGS. 1A-1C, non-machine tool specific HUPA (NMTSHUPA) maps 1195 may be generated based on empirical data received from multiple machine tools having at least a predetermined level of similarity. For example, the multiple machine tools whose empirical data is used for generating a NMTSHUPA map 1195 may be manufactured by different manufacturers but have the same power and speed capabilities. In another example, the multiple machine tools whose empirical data is used for generating a NMTSHUPA map 1195 may be manufactured by the same manufacturer and have similar mechanical structures but have different spindle ratings. In a further example, the multiple machine tools whose empirical data is used for generating a NMTSHUPA map 1195 may be manufactured by the same manufacturer or different manufacturers and have similar mechanical structures, rigidity, and ranges of movements along their various axes.

It is appreciated that separate NMTSHUPA maps 1195 may be generated for a given WMTT based on various additional parameters including, for example, a level of tool wear or a different threshold applicable to the definition of UDC. It is further appreciated that even more specific NMTSHUPA maps 1195 may be generated for a given WMTT for each combination of a plurality of selectable machining parameters, for example, the corner radius of each cutting edge, the rake angle of each cutting edge, the flute helix angle of each cutting edge, the number of layers of inserts in an insert cutter, the number of inserts in each layer, the dimensions of each insert and the extent of overlap between layers of inserts.

It is appreciated that preferably, the NMTSHUPA maps 1195 are built up based on actual recorded microphone inputs from actual past machining operations on multiple workpieces. Thus, similarly to that described hereinabove with reference to FIG. 4, initially only a few pixels, representing specific depth of cut and rpm pairings, appear, here typically represented by a black solid pixel indicating the absence of UDC and preferably also by a cross-hatched pixel indicating the presence of UDC. These pairings represent actual depth of cut and rpm pairings of historical machining operations for a given type of tool and material using one or more CNC machining centers 1124.

Over time, as more and more actual depth of cut and rpm pairings are utilized in actual machining carried out by CNC machining centers 1124, more and more pixels in each HUPA map 1195 are filled in, typically by a black solid pixel indicating the absence of UDC or by a cross-hatched pixel indicating the presence of UDC. The latest NMTSHUPA map 1195 for each different WMTT is preferably stored in HED database 1136 and is automatically consulted by the MCNCPG software 1130, such as the IMACHINING® software, to validate the acceptability of the CNC program generated thereby.

A preferred methodology for this consultation is briefly summarized below:

The MCNCPG software 1130 initially proposes a depth of cut/rpm pair;

If the depth of cut/rpm pair initially proposed by the MCNCPG software 1130 corresponds to a black solid pixel, indicating that historically UDC was not encountered, the depth of cut/rpm pair is validated;

If the depth of cut/rpm pair initially proposed by the MCNCPG software 1130 corresponds to a cross-hatched pixel, indicating that historically UDC was encountered, the depth of cut/rpm pair is disallowed;

If the depth of cut/rpm pair initially proposed by the MCNCPG software 1130 does not correspond to a black solid pixel, which black solid pixel indicates that historically UDC was not encountered, and if the depth of cut/rpm pair initially proposed by the MCNCPG software 1130 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 1130 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 1130 are cross-hatched pixels. If so, the depth of cut/rpm pair initially proposed by the MCNCPG software 1130 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 1130 are cross-hatched pixels. If so, the depth of cut/rpm pair initially proposed by the MCNCPG software 1130 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 1130 are not cross-hatched pixels. If so, the depth of cut/rpm pair initially proposed by the MCNCPG software 1130 is not disallowed.

In a situation where the depth of cut/rpm pair proposed by the MCNCPG software 1130 is neither validated nor disallowed, the system may proceed along one of the following operational paths:

1. Proceed to machine the workpiece using the depth of cut/rpm pair proposed by the MCNCPG software 1130; or
2. Perform further analysis of the depth of cut/rpm pair proposed by the MCNCPG software 1130.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 1130 is validated.

If the next order neighborhood analysis does not result in validation of the depth of cut/rpm pair proposed by the MCNCPG software 1130, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 1130 is disallowed.

If the aforesaid further analysis does not result in either validation or disallowing of the depth of cut/rpm pair proposed by the MCNCPG software 1130, preferably the system proceeds to machine the workpiece using the depth of cut/rpm pair proposed by the MCNCPG software 1130.

More specifically, in accordance with a preferred embodiment of the present invention wherein CCM software 1134 is provided, the TPG software 1132 provides a proposed tool path output, defining for each machining operation: particulars of the tool, the depth of cut, the nominal feed speed and the tool trajectory, to the CCM software 1134. The CCM software 1134 provides, on the basis of the proposed tool path output, a cutting conditions output, defining for each machining operation: tool engagement angles for each point along the trajectory, the feed speed at each point along the trajectory and the rpm. The CCM software 1134 and/or the TPG software 1132 provide a UDC avoidance input to MHBUCA module 1110 including for each machining operation: the WMTTMT, the depth of cut, and the rpm.

MHBUCA module 1110 consults HED database 1136, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described hereinabove, no change in the rpm is made by MHBUCA module 1110.

If the pairings of depth of cut and rpm did historically produce UDC for the given WMTT, or are disallowed as described above, the rpm is considered to be UDC-problematic for the indicated depth of cut. Accordingly, a change in the rpm is proposed by MHBUCA module 1110, based on HED database 1136, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Where a change in the rpm is proposed by the MHBUCA module 1110, the proposed replacement rpm is output to the CCM software 1134, which confirms that the replacement rpm is suitable for use for the given WMTT under the cutting conditions already established by the CCM software 1134 for the given operation. This confirmation is provided by the CCM software 1134 to the MCNCPG software 1130, which provides a final, UDC-free CNC program output ready for loading onto the CNC controller 1122 of a given machine tool, prior to commencement of machining.

In accordance with another preferred embodiment of the present invention wherein CCM software 1134 is not provided, the MCNCPG software 1130 provides a proposed CNC program output, defining for each machining operation: the WMTTMT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTT, the depth of cut and the rpm are supplied as a UDC avoidance input to MHBUCA module 1110.

MHBUCA module 1110 consults HED database 1136, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described hereinabove, no change in the rpm is made by MHBUCA module 1110.

If the pairings of depth of cut and rpm did historically produce UDC for the given WMTT, or are disallowed as described above, the rpm is considered to be UDC-problematic for the indicated depth of cut. Accordingly, a change in the rpm is proposed by MHBUCA module 1110, based on HED database 1136, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Additionally or alternatively, where multiple machine tools having at least somewhat different characteristics are suitable and available for a given machining operation for a given WMTT and where the historical empirical data (HED) database 1136 contains multiple HUPA maps 1195 corresponding to different available machine tools, the MHBUCA module 1110 may select one or more specific machine tools from among all of the suitable and available machine tools to carry out the machining operation. Furthermore, the MHBUCA module 1110 may select one or more specific machine tools from among all of the suitable and available machine tools which will carry out the given machining operation in an optimal manner not only from the perspective of UDC avoidance but also from the perspective of machining efficiency, such as machining cycle time.

Where a change in the rpm is proposed by the MHBUCA module 1110, the proposed replacement rpm is output to the MCNCPG software 1130, and preferably the operator confirms that the replacement rpm is suitable for use by the given tool and the given machine under the cutting conditions already established for the given operation. The MCNCPG software 1130 provides a final UDC-free CNC program ready for loading onto the CNC controller 1122 prior to commencement of machining.

It is appreciated that this embodiment of the present invention operates initially in a learning mode wherein most of the pixels in the HUPA maps 1195, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given proposed non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, or if the proposed depth of cut/rpm pair is neither validated nor disallowed, the MCNCPG software 1130 provides a final CNC program using the proposed pixel, ready for loading onto the CNC controller 1122 prior to commencement of machining.

It is a particular feature of the embodiment of the present invention described hereinabove with reference to FIG. 3B, that where the system is unable to provide a UDC prediction based on machine tool specific HUPA maps 1195, it may well be able to provide a UDC prediction based on non-machine tool specific HUPA maps 1195, which, being based on a relatively large number of machining events may be substantially more populated than corresponding machine tool specific HUPA maps 1195.

It is a particular feature of an embodiment of the present invention that various types of HUPA maps 1195 may be provided. These include, for example:

A. a machine tool specific HUPA map 1195 which is based on historical empirical data from a given machine tool;

B. a machine tool type specific HUPA map 1195, which is based on historical empirical data received from multiple machine tools of a given type;

C. a machine tool manufacturer specific map 1195, which is based on historical empirical data received from multiple machine tools made by a given manufacturer;

D. a machine tool characteristic specific map 1195, which is based on historical empirical data received from multiple machine tools having at least one given structural or operational characteristic.

Various additional types of HUPA maps 1195 may be additionally or alternatively provided.

It is appreciated that type A HUPA maps 1195 are the most reliable for UDC prediction for the given machine tool to which they relate and that typically type B-type D HUPA maps 1195 are typically less reliable for UDC prediction. Accordingly normally MHBUCA module 1110 will inquire as to whether a pixel associated with a given depth of cut/rpm is indicated to be UDC free on the type A HUPA map 1195 relating to the given machine tool. If a pixel associated with a given depth of cut/rpm is indicated to be UDC free on the type A HUPA map 1195, no further inquiry is required.

If however, the historical map generator 1190 is at a relatively early learning phase with respect to the relevant type A HUPA map 1195 and thus a pixel associated with a given depth of cut/rpm and pixels having similar rpms for the same depth of cut are not indicated to be UDC free on the type A HUPA map 1195, the MHBUCA module 1110 may consider HUPA maps 1195 of types B, C and D or other suitable HUPA maps 1195.

When UDC occurs during machining, machining is automatically and immediately stopped and a new rpm is calculated by the MCNCPG software 1130 in CNCPGCAM server 1120, which rpm is believed, based on the information in the most up to date relevant HUPA map 1195, to avoid UDC.

In cases where UDC does not occur for machining at a given depth of cut and rpm pairing for a given machine, tool and workpiece material, a corresponding pixel in an appropriate HUPA map 1195 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 1195 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 1195, thus increasing the effectiveness of the system in predicting and thus avoiding UDC.

Figure 3C:
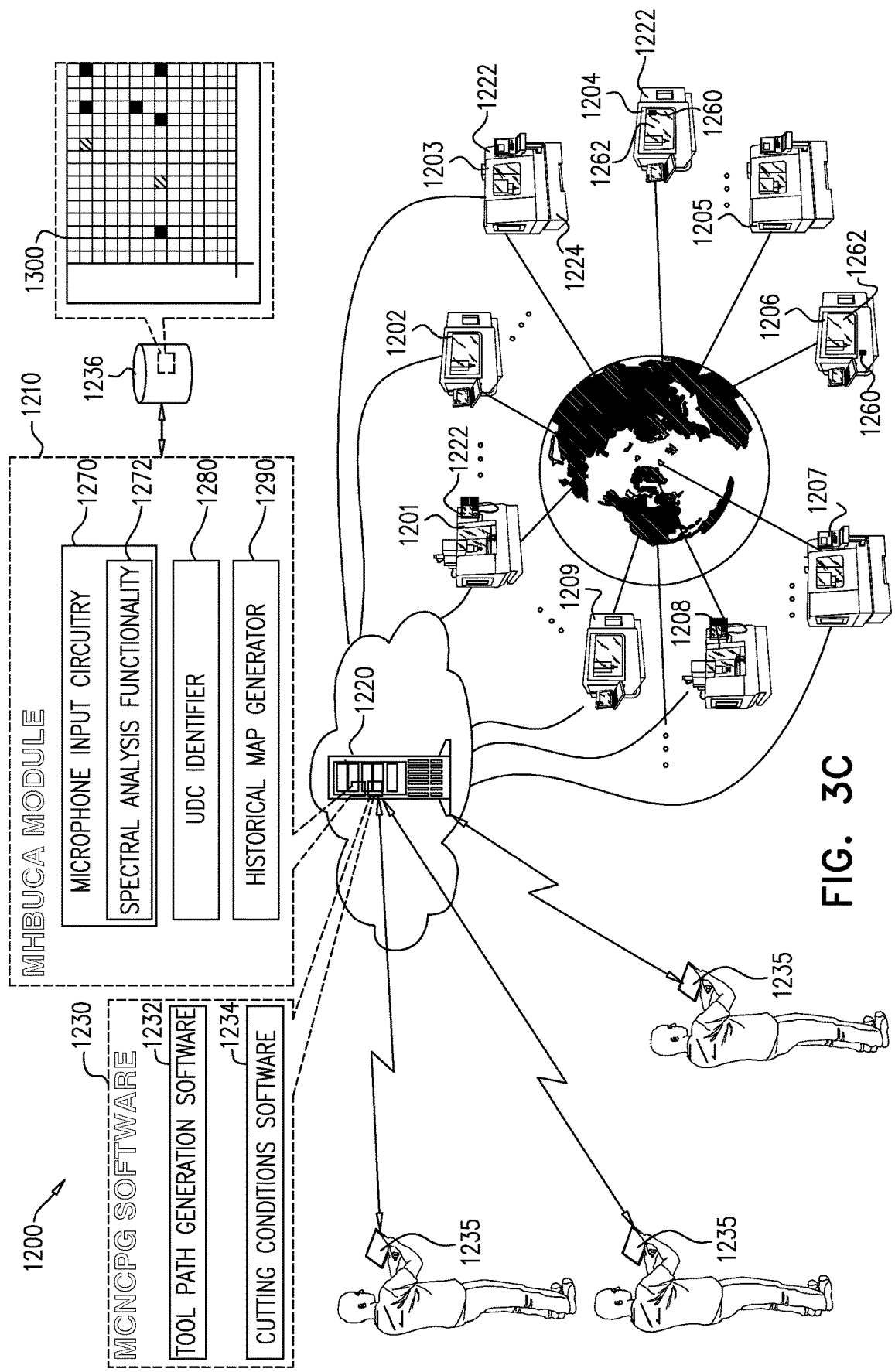
FIG. 3C is a simplified illustration of a 3-dimensional milling CNC program generation CAM and CNC milling system and methodology employing a multiplicity of machine tools, typically of various different types, and including a plurality of milling history-based undesirable chatter avoidance modules, at least one of which is resident on at least one CNC program generation CAM server, constructed and operative in accordance with yet another embodiment of the present invention.

Reference is now made to FIG. 3C, which is a simplified illustration of a milling CNC program generation CAM and CNC milling system and methodology employing a multiplicity of machine tools, typically of various different types, and preferably including at least one milling history-based undesirable chatter avoidance module resident on at least one CNC program generation CAM server, which is located on the cloud.

FIG. 3C shows a milling CNC program generation CAM and CNC milling system 1200 and methodology employing a large number of machine tools, typically of different types, made by different manufacturers and here designated by reference numerals 1201, 1202, 1203, 1204, 1205, 1206, 1207, 1208, and 1209. The machine tools are distributed over a multiplicity of workshops, which are located geographically throughout the world. In one realization of this embodiment of the invention, the machine tools are all managed by a single organization, such as, for example, an aircraft manufacturing company, which manufactures aircraft parts in multiple facilities throughout the world. In another realization of this embodiment of the invention the machine tools are managed by different entities.

System 1200 preferably comprises one or more milling history-based undesirable chatter avoidance (MHBUCA) modules 1210, constructed and operative in accordance with one embodiment of the present invention, preferably resident on one or more CNCPGCAM servers 1220 located on the cloud. The one or more CNCPGCAM servers 1220 each provide a CNC program which is supplied from the cloud to at least one CNC controller 1222 of one or more CNC milling machines, such as machining centers 1224. The CNC program preferably includes, inter alia, a tool path, spindle on/off commands, tool change commands, rpm commands, feed commands and coolant on/off commands.

In one realization of this embodiment of the invention, each organization may have one or more MHBUCA module 1210 and corresponding CNCPGCAM servers 1220 on the cloud, which receive empirical data only from machine tools managed by that organization. In another realization of this embodiment of the invention one or more MHBUCA modules 1210 and corresponding CNCPGCAM servers 1220 may be provided on the cloud and may receive empirical data from machine tools of more than one organization or entity.

In a further realization of this embodiment of the invention, which is not mutually exclusive to the realizations described in the preceding paragraph, each organization may have one or more MHBUCA module 1210 and corresponding CNCPGCAM servers 1220, which may provide NMTSHUPA maps for use by machine tools managed by that organization. In another further realization of this embodiment of the invention, which is not mutually exclusive to the realizations described in the preceding paragraph, one or more MHBUCA modules 1210 and corresponding CNCPGCAM servers 1220 may be provided, which may provide NMTSHUPA maps for use by machine tools of more than one organization or entity.

Each CNCPGCAM server 1220 may be any suitable CNC program generation CAM server and is preferably a server hosting milling CNC program generation (MCNCPG) software 1230. The MCNCPG software 1230 preferably includes tool path generation (TPG) software 1232 and cutting conditions management (CCM) software 1234.

A preferred type of MCNCPG software 1230 is Solidcam™ milling CNC program generation software and includes cutting conditions management software 1234 embodied in an IMACHINING® module, which provides an output including a set of cutting conditions suitable for each point along a given toolpath. Solidcam™ milling CNC program generation software is commercially available from the assignee of the present application, SolidCAM Ltd. of Or-Yehuda, Israel.

Aspects of the structure and operation of the IMACHINING® module are described and claimed in U.S. Pat. Nos. 8,489,224 and 9,052,704 and U.S. Patent Publication No. 2013/0345853, the disclosures of which are hereby incorporated by reference.

The system of FIG. 3C is described hereinbelow with reference to CNC machining centers, it being understood that it is at least partially applicable to other types of CNC machine tools, such as mill/turn machines.

In accordance with a preferred embodiment of the present invention, MHBUCA module 1210 stores and utilizes pairs of depth of cut and rpm at which undesirable chatter (UDC) did not occur for past machining, using at least one given type of milling machine, at least one given type of cutting tool and at least one given type of workpiece material, and thus provides undesirable chatter (UDC) avoidance as part of the CNC program generation.

In the embodiment of FIG. 3C, the MCNCPG software 1230 and CNCPGCAM server 1220 are located on the cloud and are accessed by production engineers using suitable communication devices 1235, such as smartphones or pads or notebook computers, to generate the CNC programs which are downloaded from the cloud to the controller of each one of multiple CNC machine tools.

In accordance with this embodiment of the invention, the MHBUCA module 1210 employs empirical data obtained from machining activity carried out on multiple machines, at various disparate locations, on at least one workpiece material at an earlier time, which data is stored in at least one historical empirical data (HED) database 1236, to generate and store historical mappings indicating which pairings of depth of cut and rpm produce or do not produce tool undesirable chatter (UDC) when at least one given type of tool is used to machine at least one given type of workpiece material. It is a particular feature of an embodiment of the present invention that the MHBUCA module 1210 stores and utilizes pairs of depth of cut and rpm at which undesirable chatter (UDC) did not occur for past machining, using at least one given type of milling machine, at least one given type of cutting tool and at least one given type of workpiece material, in providing chatter avoidance.

In one realization of this embodiment, each MHBUCA module 1210 receives empirical data originating from machines all belonging to a single organization. In another realization of this embodiment, at least one MHBUCA module 1210 receives empirical data originating from machines belonging to multiple organizations and entities. In both of the above realizations, each MHBUCA module 1210 receives empirical data originating from machines of the same type, manufactured by a same manufacturer or alternatively receives empirical data from machines of different types, manufactured by a same manufacturer. As a further alternative, at least one MHBUCA module 1210 receives empirical data from machines of different types, manufactured by different manufacturers.

In the illustrated embodiment of FIG. 3C, the historical empirical data is derived from earlier operation of one or more CNC machining center 1224 and is employed to generate subsequent UDC-free CNC programs for one or more CNC machining center 1224, such that milling operation of the CNC machining centers 1224 based on the CNC programs thus generated avoids UDC.

In accordance with a preferred embodiment of the invention, one or more microphone 1260 is mounted on each CNC machining center 1224, such as within the machining chamber 1262 of the CNC machining center 1224 or on an outer housing thereof. Each CNC machining center 1224 also typically includes CNC controller 1222 An output of microphone 1260 is supplied to microphone input circuitry 1270, which may include spectral analysis functionality 1272, such as Fast Fourier Transformation (FFT) functionality, which transforms the microphone output, which is in the time domain, to the frequency domain.

An output of the microphone input circuitry 1270, which preferably includes the spectral analysis functionality 1272, is in the frequency domain and is supplied to a UDC identifier 1280 which identifies peaks in the frequency domain, which are not coincident with any of the harmonic peaks characteristic of the tooth passing frequency. If such peaks exceed a given height, corresponding to a predetermined amplitude threshold characterizing UDC, the presence of UDC is identified.

In accordance with one embodiment of the invention, microphone input circuitry 1270, spectral analysis functionality 1272 and UDC identifier 1280 may be provided at each machine tool. Alternatively, the microphone input circuitry 1270 may be provided at each machine tool and the spectral analysis functionality 1272 and UDC identifier 1280 may be provided as part of at least one MHBUCA module 1210. As a further alternative, microphone input circuitry 1270, spectral analysis functionality 1272 and UDC identifier 1280 may all be provided as part of at least one MHBUCA module 1210.

A historical map generator 1290 receives a UDC presence input from at least one UDC identifier 1280 having a time stamp and also receives, from the CNC controller 1222 of the corresponding CNC machining center 1224, at least one input providing current information indicating the tool currently being used in milling, the workpiece material being milled, the current depth of cut and the current rpm. On the basis of the aforesaid inputs, the historical map generator 1290 creates a plurality of historical UDC presence/absence (HUPA) maps 1300. It is a particular feature of an embodiment of the present invention that the HUPA maps 1300 include depth of cut and rpm pairs for most or all instances where UDC did not occur. Preferably, but not necessarily, the HUPA maps 1300 also include depth of cut and rpm pairs for most or all instances where UDC did occur.

In accordance with one embodiment of the invention, historical map generator 1290 receives a UDC presence input from at least one UDC identifier 1280 based on empirical data originating from machines all belonging to a single organization. In another embodiment, historical map generator 1290 receives a UDC presence input from at least one UDC identifier 1280 based on empirical data originating from various types of machine tools belonging to multiple organizations and entities. In both of the above embodiments, historical map generator 1290 receives a UDC presence input from at least one UDC identifier 1280 based on empirical data originating from machines of the same type, manufactured by a same manufacturer, or, alternatively, based on empirical data from machines of different types, manufactured by a same manufacturer. As a further alternative, historical map generator 1290 receives a UDC presence input from at least one UDC identifier 1280 based on empirical data from machines of different types, manufactured by different manufacturers.

In accordance with an embodiment of the present application, each HUPA map 1300 is specific at least to a given combination of workpiece material and type of tool, here designated WMTT.

In accordance with one embodiment of the invention, at least one HUPA map 1300 is based on empirical data originating from machines all belonging to a single organization. In another embodiment, at least one HUPA map 1300 is based on empirical data originating from machines belonging to multiple organizations and entities. In both of the above embodiments, at least one HUPA map 1300 is based on empirical data originating from machines of the same type, manufactured by a same manufacturer or alternatively based on empirical data from machines of different types, manufactured by a same manufacturer. As a further alternative, at least one HUPA map 1300 is based on empirical data from machines of different types, manufactured by different manufacturers.

In accordance with one embodiment of the invention, similarly to the case described above with reference to FIGS. 1A-1C, each HUPA map 1300 is machine tool specific as well and thus HUPA maps 1300 are generated for each of the multiple machine tools communicating with the system. This is particularly relevant when the various CNC machining centers 1224 are of different types or have different overall operating characteristics, which render them suitable for different machining tasks. In such a case, the generation of machine tool specific HUPA maps 1300 is useful in enabling production planning and allocation of machining resources. The tool specific HUPA maps 1300 are each based on empirical data relating to a combination of workpiece material, type of tool and machine tool, here designated WMTTMT.

In accordance with another embodiment of the invention, as distinguished from the case described above with reference to FIGS. 1A-1C, non-machine tool specific HUPA (NMTSHUPA) maps 1300 may be generated based on empirical data received from multiple machine tools having at least a predetermined level of similarity. For example, the multiple machine tools whose empirical data is used for generating a NMTSHUPA map 1300 may be manufactured by different manufacturers but have the same power and speed capabilities. In another example, the multiple machine tools whose empirical data is used for generating a NMTSHUPA map 1300 may be manufactured by the same manufacturer and have similar mechanical structures but have different spindle ratings. In a further example, the multiple machine tools whose empirical data is used for generating a NMTSHUPA map 1300 may be manufactured by the same manufacturer or different manufacturers and have similar mechanical structures, rigidity, and ranges of movements along their various axes.

It is appreciated that separate NMTSHUPA maps 1300 may be generated for a given WMTT based on various additional parameters including, for example, a level of tool wear or a different threshold applicable to the definition of UDC. It is further appreciated that even more specific NMTSHUPA maps 1300 may be generated for a given WMTT for each combination of a plurality of selectable machining parameters, for example, the corner radius of each cutting edge, the rake angle of each cutting edge, the flute helix angle of each cutting edge, the number of layers of inserts in an insert cutter, the number of inserts in each layer, the dimensions of each insert and the extent of overlap between layers of inserts.

It is appreciated that preferably, the NMTSHUPA maps 1300 are built up based on actual recorded microphone inputs from actual past machining operations on multiple workpieces. Thus, similarly to that described hereinabove with reference to FIG. 4, initially only a few pixels, representing specific depth of cut and rpm pairings, appear, here typically represented by a black solid pixel indicating the absence of UDC and preferably also by a cross-hatched pixel indicating the presence of UDC. These pairings represent actual depth of cut and rpm pairings of historical machining operations for a given type of tool and material using one or more CNC machining centers 1224.

Over time, as more and more actual depth of cut and rpm pairings are utilized in actual machining carried out by CNC machining centers 1224, more and more pixels in each HUPA map 1300 are filled in, typically by a black solid pixel indicating the absence of UDC or by a cross-hatched pixel indicating the presence of UDC. The latest NMTSHUPA map 1300 for each different WMTT is preferably stored in HED database 1236 and is automatically consulted by the MCNCPG software 1230, such as the IMACHINING® software, to validate the acceptability of the CNC program generated thereby.

A preferred methodology for this consultation is briefly summarized below:

The MCNCPG software 1230 initially proposes a depth of cut/rpm pair;

If the depth of cut/rpm pair initially proposed by the MCNCPG software 1230 corresponds to a black solid pixel, indicating that historically UDC was not encountered, the depth of cut/rpm pair is validated;

If the depth of cut/rpm pair initially proposed by the MCNCPG software 1230 corresponds to a cross-hatched pixel, indicating that historically UDC was encountered, the depth of cut/rpm pair is disallowed;

If the depth of cut/rpm pair initially proposed by the MCNCPG software 1230 does not correspond to a black solid pixel, which black solid pixel indicates that historically UDC was not encountered, and if the depth of cut/rpm pair initially proposed by the MCNCPG software 1230 does not correspond to a cross-hatched pixel, which cross-hatched pixel indicates that historically UDC was encountered, a first order neighborhood analysis is preferably performed, whereby it is ascertained whether all of the pixels immediately contiguous to the four sides of the pixel representing the depth of cut/rpm pair initially proposed by the MCNCPG software 1230 are black solid pixels, if so, the initially proposed depth of cut/rpm pair is validated;

If the first order neighborhood analysis described above did not result in validating the proposed depth of cut/rpm pair, then the first order neighborhood analysis also preferably ascertains whether all of the pixels immediately contiguous to the four sides of the pixel representing the depth of cut/rpm pair initially proposed by the MCNCPG software 1230 are cross-hatched pixels. If so, the depth of cut/rpm pair initially proposed by the MCNCPG software 1230 is disallowed;

If the first order neighborhood analysis described above did not result in validating the proposed depth of cut/rpm pair and did not result in disallowing the proposed depth of cut/rpm pair, the first order neighborhood analysis preferably also ascertains if a predetermined number, less than all, or one or more predetermined configurations of the pixels immediately contiguous to the four sides of the pixel representing the depth of cut/rpm pair initially proposed by the MCNCPG software 1230 are cross-hatched pixels. If so, the depth of cut/rpm pair initially proposed by the MCNCPG software 1230 is disallowed. In an alternative embodiment, if the first order neighborhood analysis described above did not result in validating the proposed depth of cut/rpm pair and did not result in disallowing the proposed depth of cut/rpm pair, the first order neighborhood analysis preferably ascertains if a predetermined number, less than all, or one or more predetermined configurations of the pixels immediately contiguous to the four sides of the pixel representing the depth of cut/rpm pair initially proposed by the MCNCPG software 1230 are not cross-hatched pixels. If so, the depth of cut/rpm pair initially proposed by the MCNCPG software 1230 is not disallowed.

In a situation where the depth of cut/rpm pair proposed by the MCNCPG software 1230 is neither validated nor disallowed, the system may proceed along one of the following operational paths:

1. Proceed to machine the workpiece using the depth of cut/rpm pair proposed by the MCNCPG software 1230; or
2. Perform further analysis of the depth of cut/rpm pair proposed by the MCNCPG software 1230.

One example of possible further analysis is performing additional neighborhood analyses as described hereinbelow:

If the first order neighborhood analysis described above does not result in validation or disallowing of the initially proposed depth of cut/rpm pair, a next order neighborhood analysis is preferably performed, whereby it is ascertained whether all of the pixels separated by one pixel from the initially proposed depth of cut/rpm pair are black solid pixels. If so, the depth of cut/rpm pair proposed by the MCNCPG software 1230 is validated.

If the next order neighborhood analysis does not result in validation of the depth of cut/rpm pair proposed by the MCNCPG software 1230, it is ascertained whether all or at least a predetermined number or one or more predetermined configurations of the pixels separated by one pixel from the initially proposed depth of cut/rpm pair are cross-hatched pixels. If so, the depth of cut/rpm pair proposed by the MCNCPG software 1230 is disallowed.

If the aforesaid further analysis does not result in either validation or disallowing of the depth of cut/rpm pair proposed by the MCNCPG software 1230, preferably the system proceeds to machine the workpiece using the depth of cut/rpm pair proposed by the MCNCPG software 1230.

More specifically, in accordance with a preferred embodiment of the present invention wherein CCM software 1234 is provided, the TPG software 1232 provides a proposed tool path output, defining for each machining operation: particulars of the tool, the depth of cut, the nominal feed speed and the tool trajectory, to the CCM software 1234. The CCM software 1234 provides, on the basis of the proposed tool path output, a cutting conditions output, defining for each machining operation: tool engagement angles for each point along the trajectory, the feed speed at each point along the trajectory and the rpm. The CCM software 1234 and/or the TPG software 1232 provide a UDC avoidance input to MHBUCA module 1210 including for each machining operation: the WMTTMT, the depth of cut, and the rpm.

MHBUCA module 1210 consults HED database 1236, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described hereinabove, no change in the rpm is made by MHBUCA module 1210.

If the pairings of depth of cut and rpm did historically produce UDC for the given WMTT, or are disallowed as described above, the rpm is considered to be UDC-problematic for the indicated depth of cut. Accordingly, a change in the rpm is proposed by MHBUCA module 1210, based on HED database 1236, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Where a change in the rpm is proposed by the MHBUCA module 1210, the proposed replacement rpm is output to the CCM software 1234, which confirms that the replacement rpm is suitable for use for the given WMTT under the cutting conditions already established by the CCM software 1234 for the given operation. This confirmation is provided by the CCM software 1234 to the MCNCPG software 1230, which provides a final, UDC-free CNC program output ready for loading onto the CNC controller 1222 of a given machine tool, prior to commencement of machining.

In accordance with another preferred embodiment of the present invention wherein CCM software 1234 is not provided, the MCNCPG software 1230 provides a proposed CNC program output, defining for each machining operation: the WMTTMT, the depth of cut, the rpm, the feed speeds and the tool trajectory in response to a user-defined nominal cutting conditions input, defining for each machining operation along a proposed tool trajectory: nominal tool engagement angle, nominal feed speed, depth of cut and rpm.

The particulars of the WMTT, the depth of cut and the rpm are supplied as a UDC avoidance input to MHBUCA module 1210.

MHBUCA module 1210 consults HED database 1236, associated therewith, which contains the historical mappings indicating which pairings of depth of cut and rpm do not produce UDC for the given WMTT and preferably also which pairings of depth of cut and rpm do produce UDC for the given WMTT.

If the pairings of depth of cut and rpm did not historically produce UDC for the given WMTT, or are validated as described hereinabove, no change in the rpm is made by MHBUCA module 1210.

If the pairings of depth of cut and rpm did historically produce UDC for the given WMTT, or are disallowed as described above, the rpm is considered to be UDC-problematic for the indicated depth of cut. Accordingly, a change in the rpm is proposed by MHBUCA module 1210, based on HED database 1236, which contains the historical mappings indicating which pairings of depth of cut and rpm did not historically produce UDC for the given WMTT and preferably also indicating which pairings of depth of cut and rpm did historically produce UDC for the given WMTT. Preferably, an rpm which is higher than the UDC-problematic rpm is selected, however, there may be instances where an rpm which is lower than the UDC-problematic rpm is selected.

Additionally or alternatively, where multiple machine tools having at least somewhat different characteristics are suitable and available for a given machining operation for a given WMTT and where HED database 1236 contains multiple HUPA maps 1300 corresponding to different available machine tools, the MHBUCA module 1210 may select one or more specific machine tools from among all of the suitable and available machine tools to carry out the machining operation. Furthermore, the MHBUCA module 1210 may select one or more specific machine tools from among all of the suitable and available machine tools which will carry out the given machining operation in an optimal manner not only from the perspective of UDC avoidance but also from the perspective of machining efficiency, such as machining cycle time.

Where a change in the rpm is proposed by the MHBUCA module 1210, the proposed replacement rpm is output to the MCNCPG software 1230, and preferably the operator confirms that the replacement rpm is suitable for use by the given tool and the given machine under the cutting conditions already established for the given operation. The MCNCPG software 1230 provides a final UDC-free CNC program ready for loading onto the CNC controller 1222 prior to commencement of machining.

It is appreciated that this embodiment of the present invention operates initially in a learning mode wherein most of the pixels in the HUPA maps 1300, each representing a depth of cut and rpm pairing for a given machine, tool and workpiece material, are not yet marked as UDC or UDC-free pixels. In such cases, there are expected to be many situations in which a proposed pair is neither validated nor disallowed and where the system carries out machining without a definite prediction regarding UDC. It will be appreciated by persons skilled in the art that the likelihood that the system will be able to accurately predict whether or not a given proposed non-marked pixel will be UDC-free depends on the density of marked pixels in the vicinity of the proposed pixel.

If the system predicts that the proposed pixel will be a UDC pixel, the system automatically searches for a suitable UDC-free pixel as described above. If the system predicts that the proposed pixel will be a UDC-free pixel, or if the proposed depth of cut/rpm pair is neither validated nor disallowed, the MCNCPG software 1230 provides a final CNC program using the proposed pixel, ready for loading onto the CNC controller 1222 prior to commencement of machining.

It is a particular feature of the embodiment of the present invention described hereinabove with reference to FIG. 3C, that where the system is unable to provide a UDC prediction based on machine tool specific HUPA maps 1300, it may well be able to provide a UDC prediction based on non-machine tool specific HUPA maps 1300, which, being based on a relatively large number of machining events may be substantially more populated than corresponding machine tool specific HUPA maps 1300.

It is a particular feature of an embodiment of the present invention that various types of HUPA maps 1300 may be provided. These include, for example:

A. a machine tool specific HUPA map 1300 which is based on historical empirical data from a given machine tool;

B. a machine tool type specific HUPA map 1300, which is based on historical empirical data received from multiple machine tools of a given type;

C. a machine tool manufacturer specific HUPA map 1300, which is based on historical empirical data received from multiple machine tools made by a given manufacturer;

D. a machine tool characteristic specific HUPA map 1300, which is based on historical empirical data received from multiple machine tools having at least one given structural or operational characteristic.

Various additional types of HUPA maps 1300 may be additionally or alternatively provided.

It is appreciated that type A HUPA maps 1300 are the most reliable for UDC prediction for the given machine tool to which they relate and that typically type B-type D HUPA maps 1300 are typically less reliable for UDC prediction. Accordingly, normally MHBUCA module 1210 will inquire as to whether a pixel associated with a given depth of cut/rpm is indicated to be UDC free on the type A HUPA map 1300 relating to the given machine tool. If a pixel associated with a given depth of cut/rpm is indicated to be UDC free on the type A HUPA map 1300, no further inquiry is required.

If however, the historical map generator 1290 is at a relatively early learning phase with respect to the relevant type A HUPA map 1300 and thus a pixel associated with a given depth of cut/rpm and pixels having similar rpms for the same depth of cut are not indicated to be UDC free on the type A HUPA map 1300, the MHBUCA module 1210 may consider HUPA maps 1300 of types B, C and D or other suitable HUPA maps 1300.

When UDC occurs during machining, machining is automatically and immediately stopped and a new rpm is calculated by the MCNCPG software 1230 in CNCPGCAM server 1220, which rpm is believed, based on the information in the most up to date relevant HUPA map 1300, to avoid UDC.

In cases where UDC does not occur for machining at a given depth of cut and rpm pairing for a given machine, tool and workpiece material, a corresponding pixel in an appropriate HUPA map 1300 for that machine, tool and workpiece material is typically marked as a black solid pixel, to indicate that UDC did not occur during machining at that given depth of cut and rpm.

In cases where UDC does occur for machining at a given depth of cut and rpm pairing for a given machine, tool and workpiece material, a corresponding pixel in an appropriate HUPA map 1300 for that machine, tool and workpiece material is typically marked as a cross-hatched pixel, to indicate that UDC did occur during machining at that given depth of cut and rpm.

It will be appreciated by persons skilled in the art that the ongoing operation of the system enhances the learning of the system and fills in the pixels in the HUPA maps 1300, thus increasing the effectiveness of the system in predicting and thus avoiding UDC.

It will be appreciated by persons skilled in the art that the present invention is not limited by what is particularly shown and described hereinabove and includes combinations and subcombinations of various features described herein as well as modifications thereof, which are not in the prior art.

The invention claimed is:

1. A computerized method of machining a workpiece comprising:

employing an historical mapping, based on empirical data obtained from machining activity at an earlier time, said historical mapping indicating pairings of depth of cut and rpm at which undesirable chatter (UDC) did occur during machining activity at an earlier time using at least one given type of milling machine, at least one given type of cutting tool and at least one given type of workpiece material;

prior to commencing machining of said workpiece, programming a machine tool to machine said workpiece using one of said at least one given type of milling machine, one of said at least one given type of cutting tool and one of said at least one given type of workpiece material at at least one depth of cut and rpm, which, based on said historical mapping, avoid undesirable chatter, said programming comprising ascertaining a suitable rpm for a given depth of cut, which will not create UDC, by employing a plurality of known pairings of depth of cut and rpm, which plurality of known pairings are known to create UDC, from said historical mapping for said given type of milling machine, said given type of cutting tool and said given type of workpiece material; and operating said machine tool in accordance with said programming to machine said workpiece.

2. A computerized method of machining a workpiece according to claim 1 and wherein said programming also comprises:

employing an additional plurality of known pairings of depth of cut and rpm, which are known from said historical mapping for said given type of milling machine, said given type of cutting tool and said given type of workpiece material to be within a predetermined neighborhood of known pairings known not to create UDC and not to be within a predetermined neighborhood of known pairings known to create UDC for said at least one given type of milling machine, said at least one given type of cutting tool and said at least one given type of workpiece material, in order to ascertain a suitable rpm for a given depth of cut which will not create UDC.

3. A computerized method of machining a workpiece according to claim 2 and wherein said suitable rpm for said given depth of cut need not correspond to one of said known pairings.

4. A computerized method of machining a workpiece according to claim 2 and wherein said suitable rpm for said given depth of cut does not correspond to one of said known pairings.

5. A computerized method of machining a workpiece according to claim 1 and wherein said programming also comprises:

initially generating an initial CNC program for machining said workpiece without necessarily considering UDC issues, said initial CNC program including at least one proposed pairing of depth of cut and rpm for at least one given type of milling machine, at least one given type of cutting tool and at least one given type of workpiece material; and validating said at least one proposed pairing, based on said historical mapping.

6. A computerized method of machining a workpiece according to claim 1 and wherein said programming also comprises:

initially generating an initial CNC program for machining said workpiece without necessarily considering UDC issues, said initial CNC program including at least one proposed pairing of depth of cut and rpm for at least one given type of milling machine, at least one given type of cutting tool and at least one given type of workpiece material;

disallowing at least one of said at least one proposed pairing, based on said historical mapping;

generating at least one revised CNC program for machining said workpiece based on said historical mapping, said initial CNC program including at least one alternative proposed pairing of depth of cut and rpm for at least one given type of milling machine, at least one given type of cutting tool and at least one given type of workpiece material; and validating said at least one revised proposed pairing, based on said historical mapping.

7. A computerized system for machining a workpiece, said system comprising:

an historic mapping generator operative, prior to machining said workpiece, to generate an historical mapping, based on empirical data obtained from machining activity at an earlier time, indicating pairings of depth of cut and rpm at which undesirable chatter (UDC) did occur during machining activity at an earlier time using at least one given type of milling machine, at least one given type of cutting tool and at least one given type of workpiece material;

a computerized machine tool programmer operative, prior to commencing machining of said workpiece, to generate a machine tool program enabling a machine tool to machine said workpiece using one of said at least one given type of milling machine, one of said at least one given type of cutting tool and one of said at least one given type of workpiece material at at least one depth of cut and rpm, which, based on said historical mapping, avoid undesirable chatter, said computerized machine tool programmer comprising a suitable depth of cut and rpm ascertainer, said ascertainer operative to ascertain a suitable rpm for a given depth of cut which will not create UDC, by employing a plurality of known pairings of depth of cut and rpm, which plurality of known pairings are known to create UDC, from said historical mapping for said given type of milling machine, said given type of cutting tool and said given type of workpiece material; and a machine tool operable in accordance with said programming to machine said workpiece.

8. A computerized system for machining a workpiece according to claim 7 and wherein said computerized machine tool programmer also comprises:

a suitable depth of cut and rpm ascertainer, employing an additional plurality of known pairings of depth of cut and rpm, which are known from said historical mapping for said given type of milling machine, said given type of cutting tool and said given type of workpiece material to be within a predetermined neighborhood of known pairings known not to create UDC and not to be within a predetermined neighborhood of known pairings known to create UDC for said at least one given type of milling machine, said at least one given type of cutting tool and said at least one given type of workpiece material, in order to ascertain a suitable rpm for a given depth of cut which will not create UDC.

9. A computerized system for machining a workpiece according to claim 8 and wherein said suitable rpm for said given depth of cut need not correspond to one of said known pairings.

10. A computerized system for machining a workpiece according to claim 8 and wherein said suitable rpm for said given depth of cut does not correspond to one of said known pairings.

11. A computerized system for machining a workpiece according to claim 7 and wherein said computerized machine tool programmer also comprises:

an initial CNC program generator, initially generating an initial CNC program for machining said workpiece without necessarily considering UDC issues, said initial CNC program including at least one proposed pairing of depth of cut and rpm for at least one given type of milling machine, at least one given type of cutting tool and at least one given type of workpiece material; and a proposed pairing validator, validating said at least one proposed pairing, based on said historical mapping.

12. A computerized system for machining a workpiece according to claim 7 and wherein said computerized machine tool programmer also comprises:

an initial CNC program generator, initially generating an initial CNC program for machining said workpiece without necessarily considering UDC issues, said initial CNC program including at least one proposed pairing of depth of cut and rpm for at least one given type of milling machine, at least one given type of cutting tool and at least one given type of workpiece material;

a proposed pairing disallower, disallowing at least one of said at least one proposed pairing, based on said historical mapping;

a revised CNC program generator, generating at least one revised CNC program for machining said workpiece based on said historical mapping, said initial CNC program including at least one alternative proposed pairing of depth of cut and rpm for at least one given type of milling machine, at least one given type of cutting tool and at least one given type of workpiece material; and a revised proposed pairing validator, validating said at least one revised proposed pairing, based on said historical mapping.

* * * * *